(12) United States Patent
Fattal et al.

(10) Patent No.: US 8,171,051 B2
(45) Date of Patent: May 1, 2012

(54) QUANTUM-BASED OBLIVIOUS TRANSFER AND PRIVATE DATA SAMPLING PROTOCOLS AND SYSTEMS FOR PERFORMING THE SAME

(75) Inventors: David A. Fattal, Mountain View, CA (US); Marco Florentino, Mountain View, CA (US); Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 12/288,113

(22) Filed: Oct. 15, 2008

(65) Prior Publication Data
US 2010/0094842 A1 Apr. 15, 2010

(51) Int. Cl.
*G06F 7/00* (2006.01)

(52) U.S. Cl. ........ 707/783; 707/602; 707/604; 707/688; 707/694; 707/756; 356/487; 356/368; 359/483.01; 359/492.01; 726/14; 726/30

(58) Field of Classification Search .................. 707/602, 707/604, 688, 694, 756, 783; 356/487, 368; 359/483.01, 492.01; 726/14, 30
See application file for complete search history.

(56) References Cited

U.S. PATENT DOCUMENTS

| 7,881,473 B2 * | 2/2011 | Wang et al. ................... 380/263 |
| 2004/0264898 A1 * | 12/2004 | Munro et al. ................. 385/122 |

OTHER PUBLICATIONS

"No Signaling and Quantum Key Distribution" Jonathan Barrett, Lucien Hardy and Alen Kent (Jul. 1, 2005).*
"Quantum Hadamard Gate Implementation Using Planar Lightwave Circuit and Photonic Crystal Structures" Shamsolah Salemian and Shahram Mohammadnejad (Sep. 2008).*

* cited by examiner

*Primary Examiner* — Etienne Leroux
*Assistant Examiner* — Bruce Witzenburg

(57) ABSTRACT

Various embodiments of the present invention relate to oblivious transfer protocols and to system for performing oblivious transfer. Embodiments of the present invention include a private data sampling protocol that is designed to balance the competing privacy interest of a database user and a database owner. Protocol embodiments enable the database user to obtain a fixed size random sample of the available data held by the database owner without the database owner learning which bits of data were accessed.

19 Claims, 11 Drawing Sheets

Alice's list (202)

| $j$ | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| $\psi_j$ | 0 | + | + | 1 | 0 | + | 1 | + | 0 | 1 | 0 | + | 1 | 0 | 1 | + | 1 | + | 0 | + |

Figure 2A

Alice's qubits (204)

| $j$ | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| $\|\psi_j\rangle$ | $\|0\rangle$ | $\|+\rangle$ | $\|+\rangle$ | $\|1\rangle$ | $\|0\rangle$ | $\|+\rangle$ | $\|1\rangle$ | $\|+\rangle$ | $\|0\rangle$ | $\|1\rangle$ | $\|0\rangle$ | $\|+\rangle$ | $\|1\rangle$ | $\|0\rangle$ | $\|1\rangle$ | $\|+\rangle$ | $\|1\rangle$ | $\|+\rangle$ | $\|0\rangle$ | $\|+\rangle$ |

Figure 2B

Bob's results (206)

| $j$ | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| $x_j$ | -1 | 1 | 1 | 1 | -1 | 1 | 1 | 1 | -1 | -1 | 1 | 1 | -1 | b | 1 | 1 | -1 | 1 | -1 | 1 |

Alice's list (502):

| j | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| $|\psi_j\rangle$ | + | 1 | 0 | + | + | + | 0 | 1 | + | + | 1 | + | 0 | 0 | + | + | + | + | 1 | + | + | 0 | + | + | 1 | 0 | + | + | + | 1 |

Figure 5B

Alice's qubits (504):

| j | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| $|\psi_j\rangle$ | $|+\rangle$ | $|1\rangle$ | $|0\rangle$ | $|+\rangle$ | $|+\rangle$ | $|+\rangle$ | $|0\rangle$ | $|1\rangle$ | $|+\rangle$ | $|+\rangle$ | $|1\rangle$ | $|+\rangle$ | $|0\rangle$ | $|0\rangle$ | $|+\rangle$ | $|+\rangle$ | $|+\rangle$ | $|+\rangle$ | $|1\rangle$ | $|+\rangle$ | $|+\rangle$ | $|0\rangle$ | $|+\rangle$ | $|+\rangle$ | $|1\rangle$ | $|0\rangle$ | $|+\rangle$ | $|+\rangle$ | $|+\rangle$ | $|1\rangle$ |

Figure 5C

Bob's selection (506):

| j | 1 | 3 | 8 | 9 | 10 | 13 | 19 | 20 | 23 | 24 | 28 | 30 |
|---|---|---|---|---|---|---|---|---|---|---|---|---|
| $\{|\psi_j\rangle\}_{12}$ | $|+\rangle$ | $|0\rangle$ | $|1\rangle$ | $|+\rangle$ | $|+\rangle$ | $|0\rangle$ | $|1\rangle$ | $|+\rangle$ | $|0\rangle$ | $|+\rangle$ | $|+\rangle$ | $|1\rangle$ |

Figure 5D

Bob's States for cheating test (508):

| j | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| $\{|\psi_j\rangle\}_{18}$ | b | $|1\rangle$ | b | $|+\rangle$ | $|+\rangle$ | $|0\rangle$ | b | b | b | b | $|1\rangle$ | $|+\rangle$ | b | $|0\rangle$ | $|+\rangle$ | $|+\rangle$ | $|+\rangle$ | $|+\rangle$ | b | b | $|+\rangle$ | $|0\rangle$ | b | b | $|1\rangle$ | $|0\rangle$ | $|+\rangle$ | b | $|+\rangle$ | b |

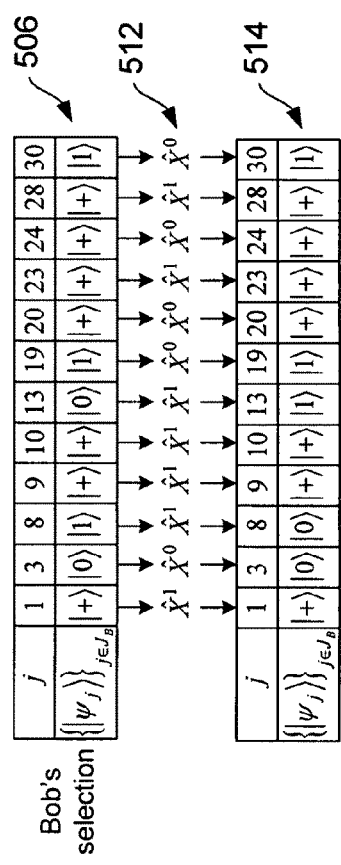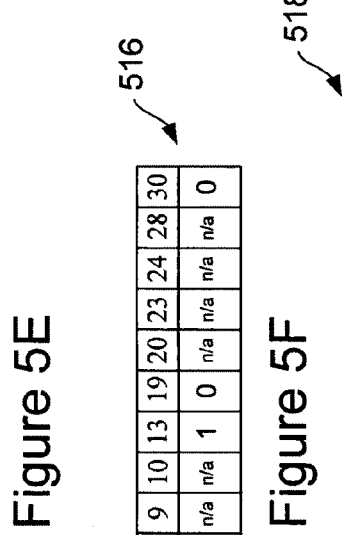
Figure 5E
Figure 5F
Figure 5G

QUANTUM-BASED OBLIVIOUS TRANSFER AND PRIVATE DATA SAMPLING PROTOCOLS AND SYSTEMS FOR PERFORMING THE SAME

TECHNICAL FIELD

Embodiments of the present invention relate to oblivious transfer and private data sampling protocols for transferring data from a database holder to a database user, and, in particular, these protocols are based on the inherent randomness of quantum mechanics to transfer data.

BACKGROUND

Transactions between parties typically involve the exchange of information stored in a database. However, the transacting parties may not trust each other, and at least one of the parties may engage in tactics that are designed to deceive the other during the transaction. Traditional solutions often include a third party entrusted with holding and controlling the database, or able to effectively punish cheaters. The trusted third party can be a bank, an insurance company, or any other organization or institution entrusted by a database owner and database user to hold and control access to the database. The database user then sends any request for information to the third party which responds by completing the transaction. However, an obvious flaw in the trusted third party scheme is that the third party can collude with the database user or the database owner to disclose information that is not supposed be disclosed.

Thus physicists and engineers have recognized a growing economic interest in systems and protocols enabling mutually distrustful database owners and database users to engage in secure transactions that do not include entrusting the database with a third party.

SUMMARY

Various embodiments of the present invention relate to quantum mechanically-based oblivious transfer and private data sampling methods and to systems for implementing oblivious transfer and private data sampling protocols. In one embodiment, a method for allowing a database user to sample data stored in a database comprises preparing multiple qubits and sending the multiple qubits from the database user to a database owner. At least one of the multiple qubits is returned to the database user from the database owner, where the database owner encodes each bit stored in the database into the state of each of the at least one multiple qubits returned to the database user. The database user measures the state of each of at least one returned qubits to determine none or at least one of the bits stored in the database.

In another embodiment, a method for providing a sample of data stored in a database of a database owner comprises receiving multiple qubits from the database user and randomly selecting at least one of the qubits. Each bit stored in the database is encoded in the state of each of the at least one selected qubits. The at least one selected qubits are returned to the database user, where the database user measures the state of each of the returned qubits to determine none or at least one of the bits stored in the database.

BRIEF DESCRIPTION OF THE DRAWINGS

FIGS. 2A-2C show example registers representing operations performed in, executing certain steps of the control-flow diagram shown in FIG. 1 in accordance with embodiment of the present invention.

FIGS. 5A-5G show example registers representing operations performed in executing certain steps of the control-flow diagram shown in FIG. 4 in accordance with embodiment of the present invention.

DETAILED DESCRIPTION

Figure 1:
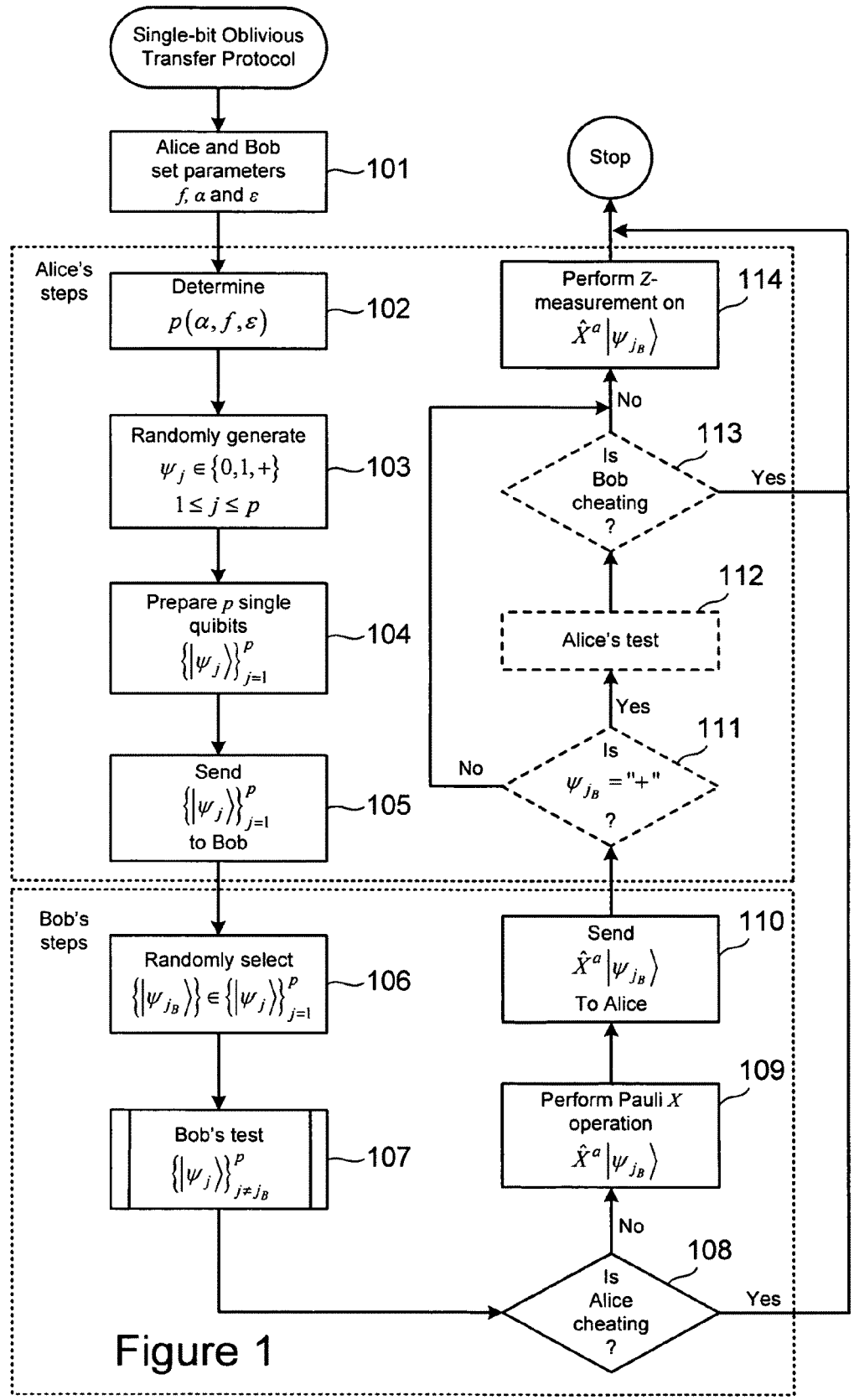
FIG. 1 shows a control-flow diagram of a single-bit quantum oblivious transfer protocol carried out in accordance with embodiments of the present invention.

In principle, public transactions over communication networks are attractive candidates for enhanced security provided by the laws of quantum mechanics. Unfortunately, most two party protocols have been proven insecure in both the classical and quantum regimes. For example, a general "no-go" theorem ("NGT") has been demonstrated stating that no deterministic, one-sided, two-party protocol could be made secure (See "Insecurity of quantum secure computations" by H. K. Lo, *Phys. Rev. A* vol. 56, 1154 (1997)). Recently, however, it was demonstrated that oblivious transfer ("OT") did not satisfy the assumptions behind the NGT, as demonstrated in "Oblivious transfer using quantum entanglement," G. He, and Z. Wang, *Phys Rev. A*, vol. 73, 012331 (2006); and "Non-equivalence of two flavors of oblivious transfer at the quantum level." G. He, and Z. Wang, *Phys Rev. A*, vol. 73, 044304 (2006). OT is a communication protocol involving two parties referred to as Alice and Bob, in which Alice tries to access a classical bit, a, which is known by Bob. Alice succeeds in accessing the bit a with a probability $\alpha$, where $0<\alpha<1$, without Bob knowing whether or not Alice has succeeded. It is the probabilistic nature of OT that circumvents the NGT.

Various embodiments of the present invention are directed to systems for performing OT. In addition, the OT protocol embodiments are generalized to private data sampling ("PDS") protocol embodiment in which Bob owns an N-bit database with bit values $\{a_1, a_2, \ldots, a_N\}$, where N is a positive integer, and Alice contracts with Bob to learn the value of each bit in the database with probability $\alpha$. In other words, Alice succeeds in sampling each bit with a probability $\alpha$, without Bob knowing which bits Alice has successfully sampled. OT and PDS protocol embodiments allow two mutually distrustful parties to exchange information without the intervention of a trusted third party. The OT and PDS protocol embodiments allow one party to access a restricted amount of data held in a database by another party via an optical network without revealing to the database holder which data was obtained. The OT and PDS protocol embodiments are performed in two rounds of entanglement-free, quantum communication and these protocols do not require quantum memory. Embodiments also include enabling each party to perform tests to determine whether or not the other party is participating honestly. The outcome of the protocol as demonstrated below is inherently random, since the same protocols executed twice with the same inputs from Alice and Bob can yield different results.

Embodiments of the present invention are mathematical in nature and, for this reason, are described below with reference to numerous equations. Although mathematical expressions, alone, may be sufficient to fully describe and characterize embodiments of the present invention to those skilled in the art of quantum optics and quantum information, the more graphical, problem oriented examples, and control-flow-diagram approaches included in the following discussion are intended to illustrate OT protocols implemented in a variety of different ways so that the present invention may be accessible to readers with various backgrounds. Embodiments for performing a single-bit OT protocol are described in a first subsection. Embodiments for performing a generalized of the OT in an N-bit PDS protocol are described in a second subsection. System embodiments for implementing the OT and PDS protocols are described in a third subsection. Finally, experimental results are presented in a fourth subsection.

A Brief Description of Related Topics in Quantum Mechanics

Quantum mechanics models the observed behavior of quantum systems comprising photons, electrons, atoms, and molecules. Quantum systems are described by states that can be characterized by measurable quantities. A state of a quantum system is represented by a ket and is denoted $|\Psi\rangle$, where $\Psi$ is a label that represents a state of a quantum system. For example, the states $|0\rangle$ and $|1\rangle$ can represent horizontally and vertically polarized electromagnetic waves or two different electron spin states.

In general, a measurement employed to determine a measurable quantity of a quantum system, such as the polarization state, is represented by an operator $\hat{\Psi}$, where the symbol "^" denotes an operator. In general, an operator operates on a ket from the left as follows:

$$\hat{\Psi}(|\Psi\rangle) = \hat{\Psi}|\Psi\rangle$$

where $\hat{\Psi}|\Psi\rangle$ is a ket representing an observed quantum state. Typically, an operator $\hat{\Psi}$ is associated with a set of states called "eigenstates." An eigenstate is represented as "$|\psi_i\rangle$" with the following property:

$$\hat{\Psi}|\psi_i\rangle = \psi_i|\psi_i\rangle$$

where i is a non-negative integer, and $\psi_i$ is a real value, called an "eigenvalue," that corresponds to a discrete measurable quantity that is observed when the quantum system is in the eigenstate $|\psi_i\rangle$.

The eigenstates of an operator are complex vectors that span a complex vector space called a "state space." The eigenstates constitute a basis of the vector space if every state belonging to the state space has a unique linear superposition on the basis. In the case of a discrete set of possible quantum states, a state $|\Psi\rangle$ in a state space spanned by the N eigenstates $\{|\psi_i\rangle\}$ of an operator $\hat{\Psi}$ can be written as a linear superposition of the eigenstates as follows:

$$|\Psi\rangle = \sum_{i=1}^{N} c_i |\psi_i\rangle$$

where $c_i$ is a complex valued coefficient called the "amplitude." A similar expansion can be written for a continuous set of possible quantum states, with the sum replaced by an integral. The state space associated with an operator is also called a "Hilbert space." A Hilbert space includes a mathematical operation called the "inner product." The inner product of two states $|\Psi\rangle$ and $|\Xi\rangle$ is represented by:

$$\langle \Xi | \Psi \rangle$$

where $\langle \Xi |$ is called a "bra," and represents the complex conjugate and transpose of the state $|\Xi\rangle$. The inner product has the following property:

$$\langle \Xi | \Psi \rangle = \langle \Psi | \Xi \rangle^*$$

where "*" represents the complex conjugate. The basis eigenstates of a Hilbert space are orthonormal, or in mathematical notation:

$$\langle \psi_i | \psi_j \rangle = \delta_{ij}$$

where $\delta_{ij}$ is 1 when i equals j, and 0 otherwise.

The states $|0\rangle$ and $|1\rangle$ are called "qubit basis states" that can be represented in set notation as $\{|0\rangle, |1\rangle\}$. Any polarization state can be represented mathematically as a linear superposition of states as follows:

$$|\psi\rangle = \beta_1 |0\rangle + \beta_2 |1\rangle$$

The state $|\psi\rangle$ is called a "qubit," and the parameters $\beta_1$ and $\beta_2$ are complex-valued coefficients. The inner product of the qubit basis states are:

$$\langle 1 | 1 \rangle = \langle 0 | 0 \rangle = 1, \text{ and}$$

$$\langle 1 | 0 \rangle = \langle 0 | 1 \rangle = 0$$

The orthonormality property of the eigenstates of a Hilbert space can be used to determine the coefficients of the linear superposition of states $|\Psi\rangle$. Taking the inner product of $|\Psi\rangle$ with $\langle \psi_j |$ gives the corresponding coefficient:

$$\langle \psi_j | \Psi \rangle = \sum_{i=1}^{N} c_i \langle \psi_j | \psi_i \rangle = \sum_{i=1}^{N} c_i \delta_{ij} = c_j$$

Substituting for the coefficients in the linear superposition gives:

$$|\Psi\rangle = \sum_{i=1}^{N} |\psi_i\rangle\langle \psi_i | \Psi\rangle$$

Because $|\Psi\rangle$ is an arbitrary ket in the Hilbert space, $$\sum_{i=1}^{N} |\psi_i\rangle\langle\psi_i| = \hat{1}$$

where "$\hat{1}$" is the identity operator. The summation is called the "completeness relation," and the eigenstates $\{|\psi_i\rangle\}$ are said to be "complete."

The eigenstates of an operator can be represented by orthogonal normalized column vectors and the operator can be represented by a square matrix. For example, the polarization states $|0\rangle$ and $|1\rangle$ can be represented by the column vectors:

$$|1\rangle \doteq \begin{bmatrix} 1 \\ 0 \end{bmatrix}, \text{ and } |0\rangle \doteq \begin{bmatrix} 0 \\ 1 \end{bmatrix}$$

where the symbol "$\doteq$" stands for "is represented by." The transposed complex conjugates of the eigenstates are represented by the row vectors:

$$\langle 1| \doteq [1\ 0], \text{ and } \langle 0| \doteq [0\ 1]$$

Using the completeness relation, an operator $\hat{O}$ on the basis $\{|\psi_i\rangle\}$ can also be represented by:

$$\hat{O} = \sum_{i=1}^{N} \sum_{j=1}^{N} |\psi_i\rangle\langle\psi_i|\hat{O}|\psi_j\rangle\langle\psi_j|$$

where $\langle\psi_i|\hat{O}|\psi_j\rangle$ is a matrix element. The matrix corresponding to the operator $\hat{O}$ on the basis $\{|\psi_i\rangle\}$ can be represented as follows:

$$\hat{O} \doteq \begin{bmatrix} \langle\psi_1|\hat{O}|\psi_1\rangle & \langle\psi_1|\hat{O}|\psi_2\rangle & \cdots & \langle\psi_1|\hat{O}|\psi_N\rangle \\ \langle\psi_2|\hat{O}|\psi_1\rangle & \langle\psi_2|\hat{O}|\psi_2\rangle & & \vdots \\ \vdots & & \ddots & \\ \langle\psi_N|\hat{O}|\psi_1\rangle & \cdots & & \langle\psi_N|\hat{O}|\psi_N\rangle \end{bmatrix}$$

For example, the Pauli $\hat{Z}$ operator can be given by:

$$\hat{Z} = |0\rangle\langle 0| - |1\rangle\langle 1|$$

and the matrix representation is given by:

$$\hat{Z} \doteq \begin{bmatrix} \langle 0|Z|0\rangle & \langle 0|Z|1\rangle \\ \langle 1|Z|0\rangle & \langle 1|Z|1\rangle \end{bmatrix}$$

$$= \begin{bmatrix} 1 & 0 \\ 0 & -1 \end{bmatrix}$$

An operator $\hat{O}$ is called a "Hermitian operator" if $$\hat{O} = \hat{O}\dagger$$

The corresponding matrix elements satisfy the condition:

$$\langle\psi_i|\hat{O}|\psi_j\rangle = \langle\psi_j|\hat{O}554|\psi_i\rangle$$

Prior to state preparation (measurement), the quantum state may be unknown and can be represented as a general possible input state represented by a (pure state) linear superposition:

$$|\Psi\rangle = \sum_{i=1}^{N} c_i |\psi_i\rangle = \sum_{i=1}^{N} |\psi_i\rangle\langle\psi_i|\Psi\rangle$$

The measurement corresponding to the operator $\hat{\Psi}$ projects the quantum system initially in the state $|\Psi\rangle$ onto one of the eigenstates $|\psi_i\rangle$. In other words, a measurement on a quantum system is essentially a filtering process that places the state of the quantum system into one of the eigenstates in the linear superposition at the time of the measurement.

There is a corresponding irreversible change to the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a $\hat{Z}$ measurement is the state $|1\rangle$, it is not possible to determine whether the system was in the state $|1\rangle$ or in a linear superposition of the states $|1\rangle$ and $|0\rangle$ at the time of the measurement.

Although it is not possible to know in advance which of the various states $|\psi_i\rangle$ the state of a quantum system will be projected onto, the probability of the quantum system being found in a particular state $|\psi_i\rangle$ immediately after the measurement is given by:

$$Pr(\psi_i) = |c_i|^2 = |\langle\psi_i|\Psi\rangle|^2$$

where $|\Psi\rangle$ is normalized, and $|c_i|^2$ equals $c_i^* c_i$ and gives the outcome probability.

A qubit system can exist in the state $|0\rangle$, the state $|1\rangle$, or in any of an infinite number of states that simultaneously comprise both $|0\rangle$ and $|1\rangle$. Any of the states that include both $|0\rangle$ and $|1\rangle$ can be represented mathematically as a linear superposition of states:

$$|\psi\rangle = \beta_1 |0\rangle + \beta_2 |1\rangle$$

where the coefficients satisfy the condition:

$$|\beta_1|^2 + |\beta_2|^2 = 1$$

Thus, when a measurement is performed on a qubit system in the state $|\psi\rangle$ one has a probability $|\beta_1|^2$ of finding the qubit system in the state $|0\rangle$ and a probability $|\beta_2|^2$ of finding the qubit system in the state $|1\rangle$. One is said to be performing a measurement on the qubit system in the basis $\{|0\rangle, |1\rangle\}$. For example, a photon source that outputs a single photon of electromagnetic radiation polarized at 45° can be represented by a coherent linear superposition of states:

$$|+\rangle = \frac{1}{\sqrt{2}}(|1\rangle + |0\rangle)$$

The expectation value of a measurement performed on a quantum system that is represented by the linear superposition of states $|\Psi\rangle$ is mathematically represented by:

$$\langle\hat{\Psi}\rangle = \langle\Psi|\hat{\Psi}|\Psi\rangle$$

and is determined by applying the completeness relation as follows:

$$\langle\hat{\Psi}\rangle = \sum_{i=1}^{N}\sum_{j=1}^{N}\langle\Psi|\psi_i\rangle\langle\psi_i|\hat{\Psi}|\psi_j\rangle\langle\psi_j|\Psi\rangle$$

$$= \sum_{i=1}^{N}\psi_i|\langle\psi_i|\psi\rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states representing each quantum system is identical prior to the measurement. In practice, such an ensemble could be realized by preparing many identical and independent quantum systems all in the same state, or by repeatedly preparing a single system in the same state.

The expectation value of a single quantum system in a state $|\Psi\rangle$ can also be described using a density operator defined by:

$$\hat{\rho} = |\Psi\rangle\langle\Psi|$$

where the state $|\Psi\rangle$ is also called a "pure state," which is distinguished from a statistical mixture of states described below. The density operator is represented in the $\{|\psi_i\rangle\}$ basis by a matrix called the "density matrix" whose matrix elements are:

$$\rho_{ij} = \langle\psi_i|\hat{\rho}|\psi_j\rangle = c_i^* c_j$$

The density operator characterizes the state of the quantum system. In other words, the density operator provides all the physical information that can be calculated from the state $|\Psi\rangle$. For example, the sum of the diagonal matrix elements of the density matrix is given by:

$$\sum_i |c_i|^2 = \sum_i \rho_{ii} = Tr(\rho) = 1$$

where Tr represents the trace, or sum of the diagonal elements, of a matrix. For example, the density matrix of a two-state quantum system in the pure state:

$$|\Psi\rangle = c_1|\psi_1\rangle + c_2|\psi_2\rangle$$

is given by:

$$\rho = \begin{bmatrix} c_1 c_1^* & c_1 c_2^* \\ c_2 c_1^* & c_2 c_2^* \end{bmatrix}$$

where the diagonal elements are the probabilities associated with projecting the quantum system into either the state $|\psi_1\rangle$ or the state $|\psi_2\rangle$, and the off-diagonal elements represent the interference effects between the states $|\psi_1\rangle$ and $|\psi_2\rangle$. In addition, the expectation value of a quantum system in the state $|\Psi\rangle$ can be expressed as:

$$\langle\hat{\Psi}\rangle = \sum_{i,j}\langle\psi_j|\Psi\rangle\langle\Psi|\psi_i\rangle\langle\psi_i|\hat{\Psi}|\psi_j\rangle$$

$$= \sum_{i,j}\langle\psi_j|\hat{\rho}|\psi_i\rangle\langle\psi_i|\hat{\Psi}|\psi_j\rangle$$

$$= Tr\{\hat{\rho}\hat{\Psi}\}$$

However, it is often the case that information about a quantum system is incomplete. For example, a quantum system can be in any one of the states $|\Psi_1\rangle$, $|\Psi_2\rangle$, $|\Psi_3\rangle$, ..., each with an associated probability $p_1$, $p_2$, $p_3$, ..., where the probabilities satisfy the conditions:

$$0 \leq p_1, p_2, p_3, \ldots \leq 1, \text{ and}$$

$$\sum_i p_i = 1$$

The quantum system is said to exist in a "statistical mixture of states." The density operator for a statistical mixture of states can be determined as follows. As described above, the probability that a measurement of the observable $\hat{\Psi}$ on a quantum system in the pure state $|\Psi_i\rangle$ yields a result $\psi_n$ is:

$$Pr_i(\psi_n) = \langle\Psi_i|\psi_n\rangle\langle\psi_n|\Psi_i\rangle = |\langle\psi_n|\Psi_i\rangle|^2$$

However, the probability $Pr_i(\psi_n)$ of observing $\psi_n$ in a statistical mixture of states is weighted by $p_i$ and the summed over $i$ to give:

$$Pr(\psi_n) = \sum_i p_i Pr_i(\psi_n)$$

$$= \sum_i p_i \langle\psi_n|\Psi_i\rangle\langle\Psi_i|\psi_n\rangle$$

$$= \langle\psi_n|\hat{\rho}|\psi_n\rangle$$

where $$\hat{\rho} = \sum_i p_i|\Psi_i\rangle\langle\Psi_i|$$

is the density operator associated with a statistical mixture of states. The associated density matrix elements are given by:

$$\rho_{np} = \langle\psi_n|\sum_i p_i|\Psi_i\rangle\langle\Psi_i||\psi_p\rangle$$

$$= \sum_i p_i c_n^{(i)} c_p^{(i)*}$$

The physical meaning of the density matrix is described for a two-state quantum system comprising a mixture of states:

ti $|\Psi_i\rangle = c_1^{(i)}|\psi_1\rangle + c_2^{(i)}|\psi_2\rangle$

The corresponding density matrix is given by:

$$\rho = \begin{bmatrix} \rho_{11} & \rho_{12} \\ \rho_{21} & \rho_{22} \end{bmatrix} = \begin{bmatrix} \sum_i p_i c_1^{(i)} c_1^{(i)*} & \sum_i p_i c_1^{(i)} c_2^{(i)*} \\ \sum_i p_i c_2^{(i)} c_1^{(i)*} & \sum_i p_i c_2^{(i)} c_2^{(i)*} \end{bmatrix}$$

The diagonal matrix elements can be interpreted to mean that when the state of the quantum system is $|\Psi_i\rangle$, the diagonal matrix element $\rho_{11}$ represents the average probability of finding the quantum system in the state $|\psi_1\rangle$, and the diagonal matrix element $\rho_{22}$ represents the average probability of finding the quantum system in the state $|\psi_2\rangle$. When the same measurement is carried out N times under identical conditions, $N\rho_{11}$ will be found in the state $|\psi_1\rangle$ and $N\rho_{22}$ will be found in the state $|\psi_2\rangle$. The off-diagonal elements $\rho_{12}$ and $\rho_{21}$ express the average interference effects between the states $|\psi_1\rangle$ and $|\psi_2\rangle$. Note that unlike the diagonal matrix elements, the off-diagonal matrix elements can be zero even though neither of the products $c_1^{(i)}c_2^{(i)*}$ and $c_2^{(i)}c_1^{(i)*}$ is zero, which means that the average over N measurements has cancelled out the interference effects of the states $|\psi_1\rangle$ and $|\psi_2\rangle$.

Oblivious Transfer Protocol Embodiments

In the OT protocols described below, Bob can perform a test to check whether or not Alice is participating honestly, with security parameters $\epsilon$ and f. When Alice is honest, Alice should pass Bob's test with probability greater than 1−f, and Bob is assured that the fraction of additional information that Alice can extract from the database is less than $\epsilon$. In all cases, Bob is not able to determine Alice's state of knowledge about the contents of the database with any certainty. In addition, Alice has the option of trying a simple test to detect whether Bob is attempting to ascertain her knowledge with finite probability for each bit in the database. Because Bob is most likely providing data for many users over a large number of transactions, Bob has a very strong motivation to follow the protocol honestly.

First, a single-bit quantum oblivious transfer protocol is described and a mathematical proof of its security is provided. Second, a generalized multi-bit private data sampling PDS protocol is described as a generalization of the single-bit OT.

I. Single-bit Quantum Oblivious Transfer Protocol

FIG. 1 shows a control-flow diagram of a single-bit QOT protocol carried out in accordance with embodiments of the present invention. In describing a number of the steps of the control-flow diagram, reference is made to example registers shown in FIG. 2. As shown in FIG. 1, step 101 is performed by Alice and Bob, steps 102-105 are performed by Alice alone, steps 106-110 are performed by Bob alone, and steps 111-114 are performed by Alice alone.

In step 101, Alice contracts with Bob to learn the value of a bit a in Bob's possession with probability α, without Bob learning whether or not Alice succeeded. In other words, there is a probability of 1−α that Alice will not learn the value of bit a. Alice and Bob agree on the value of the parameters α, $\epsilon$, and f. Bob assumes that Alice's hardware satisfies a list of requirements, such as minimum detector efficiency, and Alice understands that Bob will take steps to ensure that her success probability does not exceed α by more than the factional quantity $\epsilon$. Bob and Alice perform the protocol in the basis $\{|0\rangle,|1\rangle\}$, where the states $|0\rangle$ and $|1\rangle$ are eigenvectors of the Pauli $\hat{Z}$ operator with eigenvalues +1 and −1, respectively. The bit a is eventually encoded in one of the qubit basis states $|0\rangle$ and $|1\rangle$. Alice also prepares a third qubit state $|+\rangle$ that is used by both Alice and Bob to test whether or not the other is participating honestly. When Bob encodes the value of the bit a in the state of one of the qubits sent by Alice, Bob ideally has no knowledge of the state of the selected qubit prior to encoding the bit a, as described in step 109. Bob uses the remainder of the qubits to test whether or not Alice is participating honestly, as described in step 107. In certain embodiments, the states $|0\rangle$ and $|1\rangle$ can be horizontally and vertically polarized photons, respectively, and the state $|+\rangle$ can be a photon polarized at 45°, where $|+\rangle=(|0\rangle+|1\rangle)/\sqrt{2}$.

In step 102, given the parameters α, $\epsilon$, and f, Alice selects an integer parameter p that ideally satisfies the condition:

$$p > \frac{8\alpha}{(\epsilon - 1/p)^2} \ln\frac{2}{f}.$$

In step 103, Alice randomly generates a list $\psi_j$ of p symbols, each of which is selected from the set $\{0,1,+\}$ with the constraint that the occurrence frequency of the symbols should be $\{\alpha/2, \alpha/2, 1-\alpha\}$, respectively, where j is an integer index satisfying the condition $1 \leq j \leq p$. FIG. 2A shows an example register 202 of p equal to 20 symbols selected at random from the set $\{0,1,+\}$ and satisfying the occurrence frequency constraint $\{\alpha/2,\alpha/2,1-\alpha\}$ for α equal to 0.6. As shown in FIG. 2A, there are 8 entries for the symbol "+" (i.e., (1−α)20 or 0.4×20), and there are 6 entries for each of the symbols "0" and "1" (i.e., (α/2)20 or 0.3×20).

Returning to FIG. 1, in step 104, Alice prepares p single qubits states $|\psi_j\rangle$, where the qubits states $|0\rangle$ and $|1\rangle$ represent the symbols "0" and "1," respectively, and the state $|+\rangle$ represents the symbols "+." FIG. 2B shows an example register 204 of qubits generated by Alice that correspond to the register 202 of symbols displayed in FIG. 2A in accordance with embodiments of the present invention. For example, Alice can realize the symbol "0" in the first entry j equal to 1 of the register 202 by preparing a photon in a horizontal polarization qubit state $|0\rangle$ and realize the symbol "+" in the second entry j equal to 2 of the register 202 by preparing a photon in a 45° polarization qubit state $|+\rangle$. As described below, the qubit states $|+\rangle$ are used to perform separate tests that determine whether one or both Alice and Bob are cheating, and the qubits states $|0\rangle$ and $|1\rangle$ are used to encode the value of the bit a.

Returning to FIG. 1, in step 105, Alice sends the entire set of p qubit states $\{|\psi_j\rangle\}_{j=1}^p$ to Bob via a quantum channel. For example, Alice can send polarized photons to Bob via free space or over a waveguide. Note that in certain embodiments the states can be sent sequentially so that Bob receives each qubit state one-at-a-time as they are prepared by Alice in order of increasing p.

In step 106, Bob randomly selects a single qubit state $\{|\psi_{j_B}\rangle\}$ from the set of qubit states $\{|\psi_j\rangle\}_{j=1}^p$, where $1 \leq j_B \leq p$. The selected qubit state $\{|\psi_{j_B}\rangle\}$ is used to encode the bit a in subsequent step 109 described below. The remaining qubit states $\{|\psi_j\rangle\}_{j \neq j_B}^p$ are used by Bob to determine whether or not Alice has attempted to cheat by sending p states that are not in compliance with the occurrence frequency constraint $\{\alpha/2,\alpha/2,1-\alpha\}$.

In step 107, Bob performs a test described below with reference to a control-flow diagram titled "Bob's test" shown in FIG. 3. In step 108, based on the results obtained in Bob's test conducted in step 107, when Bob determines that Alice is cheating, Bob terminates the QOT protocol. Otherwise, when Bob determines in step 107 that Alice is participating honestly, Bob proceeds to step 109.

In step 109, Bob encodes the bit a into the single qubit state $\{|\psi_{j_B}\rangle\}$ extracted from the set of qubit states $\{|\psi_j\rangle\}_{j=1}^P$ in step 106 by performing a Pauli X operation on the state $\{|\psi_{j_B}\rangle\}$ when the bit a is "1," or by performing no operation on the state $\{|\psi_{j_B}\rangle\}$ when the bit a is "0." The Pauli X operation is represented mathematically by an operator:

$$\hat{X}^a |\psi_{j_B}\rangle = \begin{cases} \hat{X} |\psi_{j_B}\rangle & \text{for } a = \text{``1''} \\ \hat{1} |\psi_{j_B}\rangle & \text{for } a = \text{``0''} \end{cases}$$

where $\hat{X}$ is the Pauli X operator given by:

$$\hat{X} = |1\rangle\langle 0| + |0\rangle\langle 1|$$

For example, when the bit a that Bob is holding is "1," the Pauli X operation yields:

$$\hat{X}|1\rangle = |0\rangle$$

$$\hat{X}|0\rangle = |1\rangle, \text{ or}$$

$$\hat{X}|+\rangle = |+\rangle$$

In other words, the Pauli X operation flips the qubit basis states $|0\rangle$ and $|1\rangle$ and leaves the qubit state $|+\rangle$ essentially unchanged. For example, when the qubit states $|0\rangle$, $|1\rangle$, or $|+\rangle$ representing horizontal, vertical, and 45° polarization states, respectively, the Pauli X operator flips the polarization states $|0\rangle$ and $|1\rangle$ by 90°. When the value of the bit a is "1," the state $|0\rangle$ becomes $|1\rangle$ or the state $|1\rangle$ becomes $|0\rangle$. On the other hand, when the value of the bit a is "0," the qubit states $|0\rangle$ and $|1\rangle$ are unchanged. Thus Bob can only encode information regarding the value of the bit a by either flipping the qubit basis states $|0\rangle$ and $|1\rangle$ or leaving the qubit basis states $|0\rangle$ and $|1\rangle$ unchanged. Bob encodes no information regarding the value of the bit a when the state $|\psi_{j_B}\rangle$ is $|+\rangle$.

In step 110, Bob returns the state $\hat{X}^a|\psi_{j_B}\rangle$ to Alice via a quantum communication channel, and returns the associated value of $j_B$ and optionally returns the results obtained from Bob's test in step 107 via a classical channel.

Steps 111-113 are optional and relate to a test Alice performs to determine whether Bob is participating honestly in executing his obligations under the QOT protocol. Ideally, Bob does not know whether the state $|\psi_{j_B}\rangle$ is $|0\rangle$, $|1\rangle$, or $|+\rangle$. Bob can cheat however by measuring the state $|\psi_{j_B}\rangle$. In optional step 111, Alice examines the value of $j_B$ returned by Bob. Because Alice generated the qubit state $|\psi_{j_B}\rangle$ associated with $j_B$, Alice knows whether the state returned $\hat{X}^a|\psi_{j_B}\rangle$ by Bob should be the qubit state $|+\rangle$ or one of the qubit basis states $|0\rangle$ and $|1\rangle$. When $\psi_{j_B}$ equals "+" Alice performs the test by proceeding to step 112, otherwise, Alice can proceed to step 114. In optional step 112, Alice performs a Pauli X measurement on the state $\hat{X}^a|\psi_{j_B}\rangle$. When Alice does not obtain the eigenvalue +1, Alice knows that Bob has cheated, Bob fails the test and Alice terminates the QOT protocol.

In step 114, Alice performs a Pauli Z measurement. When $\psi_{j_B}$ equals "+," Alice learns nothing, because, as described above in step 109, the Pauli X operation performed by Bob in step 109 does not change the qubit state $|+\rangle$. But, when $\psi_{j_B}$ equals "0" or "1," which should occur with probability $\alpha$, then the state returned by Bob is $|\psi_{j_B} \oplus a\rangle$, and Alice can retrieve the bit value a by performing the Pauli Z measurement. Alice knows the state of the qubit she prepared in association with the value $j_B$. Alice performs the Pauli Z measurement to determine the state of qubit $\hat{X}^a|\psi_{j_B}\rangle$ returned by Bob and compares it with the state she originally prepared $|\psi_{j_B}\rangle$. When the Pauli Z measurement reveals that the state of the qubit returned by Bob $\hat{X}^a|\psi_{j_B}\rangle$ is different from the state of originally prepared qubit $|\psi_{j_B}\rangle$ the bit a value is "1," and when the Pauli Z measurement reveals that the state of the qubit returned by Bob $\hat{X}^a|\psi_{j_B}\rangle$ is the same as the state of the originally prepared qubit $|\psi_{j_B}\rangle$ the bit a value is "0." For example, suppose Alice originally prepared the qubit basis state $|0\rangle$ associated with $j_B$. When the Pauli Z measurement reveals that $\hat{X}^a|\psi_{j_B}\rangle$ is the qubit basis state $|1\rangle$, Alice recognizes that the state of the originally prepared qubit has been flipped and the value of the bit a held by Bob is "1." On the other hand, when the Pauli Z measurement reveals that state of qubit returned by Bob $\hat{X}^a|\psi_{j_B}\rangle$ is the qubit basis state $|0\rangle$, Alice recognizes that the state has not been flipped and Alice knows that the value of the bit a held by Bob is "0."

Figure 3:
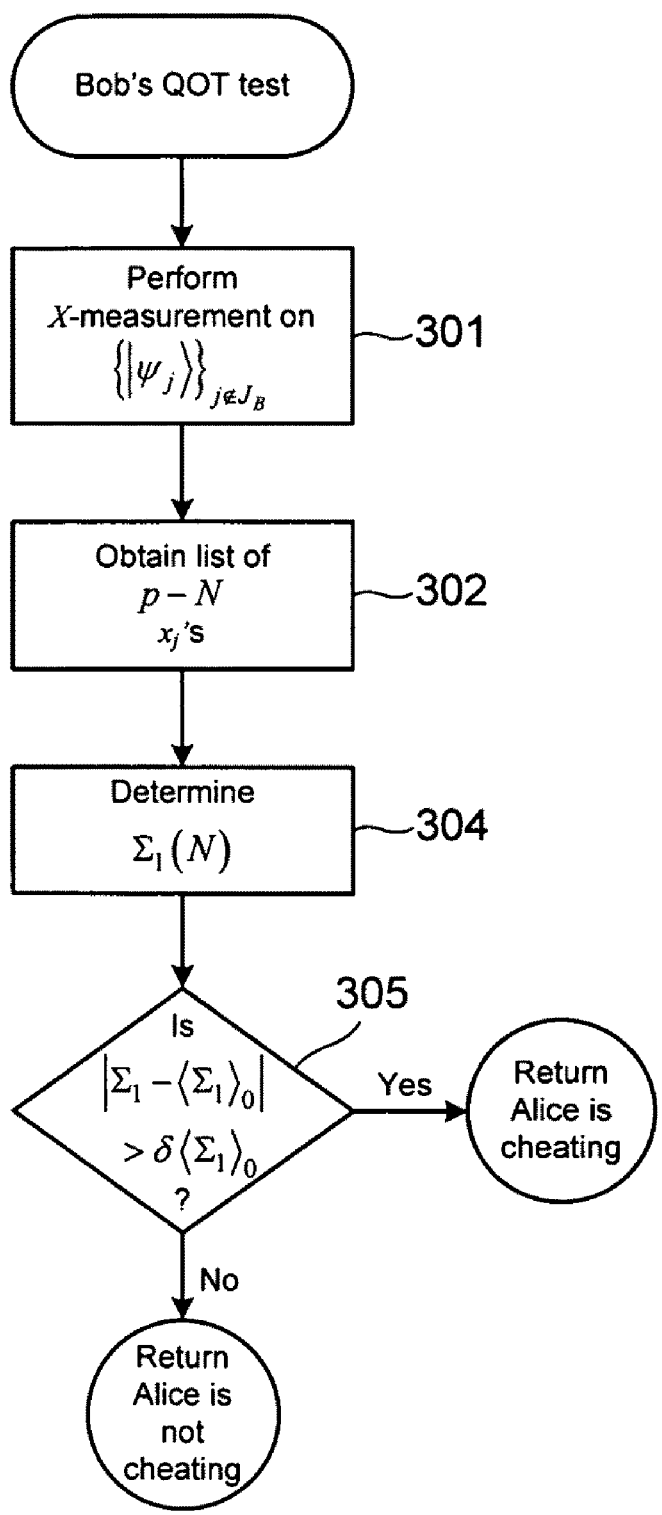
FIG. 3 shows a control-flow diagram of a routine referred to in step 107 of the control-flow diagram shown in FIG. 1, in accordance with embodiments of the present invention.

FIG. 3 shows a control-flow diagram of the routine "Bob's test" referred to in step 107 of the control-flow diagram shown in FIG. 1, in accordance with embodiments of the present invention. In step 301, Bob performs a Pauli X measurement as described in step 112 on each of the qubit states $\{|\psi_j\rangle\}_{j\neq j_B}^P$. In step 302, Bob obtains a list of p−1 Pauli X measurement eigenvalues $x_j = \pm 1$, that will signal to him that Alice is cheating.

FIG. 2C shows an example register 206 of p−1 $x_j$ values obtained from performing the Pauli X measurement to the corresponding qubits displayed in the register 204 in accordance with embodiments of the present invention. In FIG. 2C, the entry for $x_{14}$ is "b," which represents a qubit state randomly selected by Bob in step 106. Thus, no Pauli X measurement can be performed on the state $|\psi_{14}\rangle = |0\rangle$.

Returning to FIG. 3, in step 303, Bob averages over the p−1 $x_j$ values in accordance with:

$$\sum_1 (j_B) = \frac{1}{p-1} \sum_{j \neq j_B} x_j$$

By the Law of Large Numbers, when Alice is participating honestly, the average value $\langle \Sigma_1(j_B) \rangle$ of the $x_j$'s should be approximately equal to $\langle \Sigma_1 \rangle_0 = 1 - \alpha$ with high probability. In step 304, Alice fails this test when Bob finds that $$\left| \sum_1 (j_B) - \langle \sum_1 \rangle_0 \right| > \delta \langle \sum_1 \rangle_0 \qquad \text{Equation (1)}$$

where $$\delta = \frac{\varepsilon - 1/p}{1 - \alpha}$$

Bob chooses $\delta$ to limit the probability that Alice learns the value of the bit a to no more than $\alpha + \epsilon$.

A. A Dishonest Strategy for Alice

The following description of the security of the QOT protocol begins by considering the case where Alice tries to learn the value of Bob's bit with a probability that exceeds the agreed-upon value of α, simply by choosing a set of symbols in step 103 of the protocol with equal occurrence frequencies for "0" and "1" that are greater than α/2. Suppose that Bob performed an X measurement on all of Alice's qubits, yielding p results $x_j = \pm 1$. Then the average value of the random variable $$\sum_1 \equiv \frac{1}{p}\sum_j x_j$$

deviates significantly from the value expected by Bob, increasing exponentially the probability that Alice will fails Bob's test.

What value of δ can Bob choose to limit Alice's success probability to a maximum of α+ϵ for some ϵ>0? As described above in step 304 of the control-flow diagram shown in FIG. 3, Bob actually measures all qubits but $j_B$, obtaining a value of the random variable $$\sum_1 (j_B) = \frac{1}{p-1}\sum_{j \neq j_B} x_j$$

that Bob then tests using the condition given in step 305. When $\Sigma_1$ and $\Sigma_1(j_B)$ differ by at most 1/p (for large p), Bob may reasonably be expected to continue the protocol when, as proved rigorously in section I.B below, Alice chooses her symbols so that $$\left|\sum_1 (j_B) - \left\langle\sum_1\right\rangle_0\right| \leq \delta\left\langle\sum_1\right\rangle_0 + \frac{1}{p}$$

Therefore, Alice can maximize the probability $P_A \leq 1 - \langle\Sigma_1\rangle$ that she can obtain the value of "a" and pass Bob's test if her qubits satisfy $$\left\langle\sum_1\right\rangle \geq \left\langle\sum_1\right\rangle_0 (1-\delta) - \frac{1}{p}$$

yielding $$P_A \leq \alpha + \frac{1}{p} + \delta(1-\alpha).$$

However, if Bob chooses $$\delta = \frac{\varepsilon - 1/p}{1-\alpha}$$

then $P_A \leq \alpha + \epsilon$, and Alice's success probability (and her temptation to cheat) can be effectively constrained.

A fair protocol also ensures that Bob is very unlikely to end the transaction if Alice is in fact executing the steps faithfully. In this case, a fraction 1−α of the $x_j$'s are deterministically set to "+1," while the remaining fraction α are independent identically distributed ("i.i.d.") random variables with mean value 0 and variance 1. The mean bit value $\Sigma_1(j_B)$ can be a random variable with a near-gaussian probability distribution with mean 1−α and variance α/p for p large. More precisely, the probability that Equation (1) is not satisfied when the protocol is properly followed is less than $2\exp[-p\delta^2\langle\Sigma_1\rangle_0^2/8(1-\langle\Sigma_1\rangle_0)]$. Therefore, to insure that Bob's test fails improperly with probability less than f, it is sufficient to require that the number of qubits p sent by Alice exceeds a minimum value given by $$p > \frac{8\left(1-\left\langle\sum_1\right\rangle_0\right)}{\delta^2\left\langle\sum_1\right\rangle_0^2}\ln\frac{2}{f} = \frac{8\alpha}{(\varepsilon - 1/p)^2}\ln\frac{2}{f}$$

The above inequality assumes ideal quantum channels with perfect detectors and no transmission errors. Inevitably, due to imperfect preparation, transmission, and measurement of the qubits, Alice and Bob have to compromise in order to complete a transaction in the real world. For example, Alice has to meet minimum detector efficiency requirements set by Bob or her success probability may be significantly lower than α, and Bob has to set a constraint more lenient than Equation (1), at the expense for the security of his test.

B. General Optimum Strategies for Alice and Bob

In general, Alice can follow the QOT protocol by preparing a joint pure state $|\Psi_{AB}\rangle$ between a local register space A with eigenstates $|A_0\rangle$, $|A_1\rangle$, and $A_+\rangle$, and a p-qubit space B sent to Bob. This "pure" strategy includes any "mixed" strategy by definition, since a mixed strategy is the partial trace of a pure strategy in a higher-dimensional local ancillary register. In addition, the partial trace on a part of Alice's register commutes with the action of Bob on $|\Psi_{AB}\rangle$, and therefore can conceptually be postponed until the end of the protocol as part of Alice's readout operation. For example, one pure state corresponding to an honest strategy for Alice in the single-qubit case is $$|\Psi_{AB}\rangle = \sqrt{\alpha/2}|A_0\rangle|0\rangle + \sqrt{\alpha/2}|A_1\rangle|1\rangle + \sqrt{1-\alpha}|A_+\rangle|+\rangle$$

In this case, Alice first measures the register A, which prepares the qubit in register B in qubit state $|0\rangle$, $|1\rangle$, or $|+\rangle$ with the expected probabilities $\{\alpha/2, \alpha/2, 1-\alpha\}$, and then sends the qubit to Bob. However, since Bob only operates on register B, Alice could also perform the A register measurement after Bob returns (a fraction of) register B to her. The two scenarios provide Alice with identical quantities of information, and Alice's input in the second case is the pure state $|\Psi_{AB}\rangle$. Therefore, in the remainder of this paper, it is assumed without loss of generality that Alice's input to the protocol is always some pure state $|\Psi\rangle$ and this state simply referred to as "Alice's strategy."

In general, after Bob chooses index $j_B$ at step 106 of the protocol, Alice faces the problem of distinguishing two possibly mixed states, $\rho_{j_B}$ and $X_j\rho_{j_B}X_j$, where $$\rho_{j_B} = Tr_{\bar{j}_B}(|\Psi\rangle\langle\Psi|)$$

Here $Tr_{\bar{j}_B}$ denotes the partial trace operation over all qubits of space B except qubit $j_B$. We note that the probability of obtaining an inconclusive result when trying to discriminate two equiprobable mixed states ρ and σ is greater than the fidelity $F(\rho,\sigma)$ equals $Tr(|\sqrt{\rho}\sqrt{\sigma}|)$. Invoking the monotonicity of the fidelity under trace-preserving operations (i.e., completely positive maps) and averaging over all choices of j, gives an upper bound for Alice's average probability of success:

$$P_A \leq 1 - \frac{1}{p}\sum_j |\langle\Psi|X_j|\Psi\rangle|$$

Therefore, using the triangle inequality, gives $$P_A \leq 1 - |\langle \Sigma_1 \rangle|$$

if $\Sigma_1$ is defined as the operator $(1/p)\Sigma_j X_j$.

Although the QOT protocol is designed to allow Alice to generate and transmit qubits sequentially, let us assume that she can generate and store all of (or any subset of) her qubits prior for transmission to Bob. Defining $|-\rangle = (|0\rangle - |1\rangle)/\sqrt{2}$, $|\Psi_{AB}\rangle$ becomes $$|\Psi_{AB}\rangle = |A'_-\rangle|-\rangle + |A'_+\rangle|+\rangle$$

where $$|A'_-\rangle = \sqrt{\alpha}(|A_0\rangle - |A_1\rangle)/2, \text{ and}$$

$$|A'_+\rangle = \sqrt{\alpha}(|A_0\rangle + |A_1\rangle)/2 + \sqrt{1-\alpha}|A_+\rangle.$$

In fact, Alice's most general p-qubit pure state can always be written in the form $$|\Psi\rangle = \sum_{m=0}^{2^p-1} |A_m\rangle|m\rangle$$

where m has a binary representation with p bits $m_j$, the value $m_j$ equals 0 or 1 signals that the $j^{th}$ qubit of register B is in state $|+\rangle$ or $|-\rangle$ respectively, and the local register states $|A_m\rangle$ are not normalized.

When Bob measures all qubits except $j_B$, Bob obtains the result $m_{j_B}$ with probability $$p(m_{j_B}) = Tr_{j_B}[\langle m_{j_B}|\Psi\rangle\langle\Psi|m_{j_B}\rangle]$$

where $Tr_{j_B}$ denotes the trace operation on the complementary subspace to $j_B$. The corresponding post-measurement state $$\rho(m_{j_B}) = \frac{\langle m_{j_B}|\Psi\rangle\langle\Psi|m_{j_B}\rangle}{p(m_{j_B})}$$

Bob continues with the protocol only if $m_{j_B}$ passes the test given by Equation (1), such that $$\left|\frac{1}{p-1}\sum_{j \neq j_B} (-1)^{m_j} - \langle\Sigma\rangle_0\right| \leq \delta\langle\Sigma\rangle_0$$

If $m_{j_B}$ does not pass the test, Bob stops the protocol, as described in step 108, and Alice gains no information at all. Because m and $m_{j_B}$ differ only by 1 bit, it is observed that the subspace $S_{fail}$ of Alice's strategy that obeys $$\left|\frac{1}{p}\sum_{j} (-1)^{m_j} - \langle\Sigma\rangle_0\right| > \delta\langle\Sigma\rangle_0 + \frac{1}{p}$$

never passes Bob's test. Therefore, from Alice's viewpoint, Alice maximizes the information she receives from the database when, instead of using the most general strategy $\Psi$, Alice transmits to Bob the projection of Alice's most general p-qubit pure state $|\Psi\rangle$ onto the subspace orthogonal to $S_{fail}$ (i.e., the state obtained by removing the failing instances of m from $|\Psi\rangle$). For that optimized strategy, the expectation value of the operator $\Sigma_1$ must always satisfy the inequality $$\left|\sum_{1} - \langle\sum\rangle_0\right| \leq \delta\langle\sum\rangle_0 + \frac{1}{p}.$$

and the appropriate choices $\delta$ and p defined above for Alice's simplest (dishonest) strategy. In other words, given these choices of the test parameters for some $\alpha$, $\epsilon$, and f there is no strategy available to Alice that allows her to learn the value of Bob's bit a with a probability greater than $\alpha + \epsilon$.

In the simplest case, as described in steps 111-113, Alice can determine (probabilistically) whether or not Bob is following the protocol fairly by performing an X measurement on the qubit returned to her when $j_B$ corresponds to the transmitted state $|+\rangle$. When Alice obtains any result other than +1, Alice knows that Bob is manipulating the state improperly. More generally, Bob's strategy succeeds when Bob has some finite probability of unambiguously determining Alice's knowledge of the protocol outcome, such that (1) Alice believes that she did not learn the value of bit a; (2) Alice believes that a equals 0; or Alice believes that a equals 1. Bob therefore assesses whether $\psi_j$ equals "+" or $\psi_j$ equals "0" or "1" for at least one index j, and in the latter case Bob can either to discriminate "0" from "1" or at least avoid perturbing the state $|\psi_j\rangle$ (otherwise, Bob knows that Alice believes she knows the value of bit a, but not what value she attributes to it).

Because the states $|0\rangle, |1\rangle$, and $|+\rangle$ are linearly dependent, Bob can do neither unambiguously. Suppose that Bob can determine with certainty whether $\psi_j$ equals "+" with some finite probability. Then he can design a one-qubit POVM operation $\pi_j^+$ that satisfies $$\langle +_j|\pi_j^+|+_j\rangle < 0$$

$$\langle 0_j|\pi_j^+|0_j\rangle = 0$$

$$\langle 1_j|\pi_j^+|1_j\rangle = 0$$

Under these conditions $$\langle -_j|\pi_j^+|-_j\rangle = -\langle +_j|\pi_j^+|+_j\rangle < 0$$

which shows that $\pi_j^+$ cannot be positive. A similar proof shows that Bob cannot unambiguously assess whether $\psi_j$ equals "0," or whether $\psi_j$ equals "1."

Finally, suppose that Bob can determine whether or not $\psi_j$ belongs to the set $\{0,1\}$ with a finite probability, without perturbing the states $|0\rangle$ and $|1\rangle$. Then Bob can find a measurement operator M that obeys $$\langle +|M^\dagger M|+\rangle = 0$$

and that maps states $|0\rangle$ and $|1\rangle$ onto two orthogonal states such that $$\langle 0|M^\dagger M|1\rangle = 0$$

However, using the second relation to evaluate the first gives $$\langle 0|M^\dagger M|0\rangle = \langle 1|M^\dagger M|1\rangle = 0,$$

implying that $M^\dagger M = 0$ and indicating that M can provide no information.

In fact, the maximum average probability that Bob can correctly guess the value of $\psi_j$ for a particular j can be derived. Because the set of possible states transmitted by Alice (and their respective probabilities) is mirror-symmetric with respect to the state |+⟩, Bob's optimal probability of a correct guess is $P_B=\alpha$ when $\alpha \geq 2/3$, and $P_B=(1-\alpha)^2/(1-5\alpha/4)$ if $\alpha \leq 2/3$. However, if Bob adopts this strategy, then there is a finite probability that Bob fails Alice's test, because Bob will sometimes mistake "+" for "0" or "1." The only way that Bob can guarantee that he always passes Alice's test is to avoid perturbing a |+⟩ state, which happens only if Bob either measures the qubit in the X basis or follows the protocol honestly and performs no measurement at all. If he performs a Pauli X measurement on qubit $j_B$, and obtains −1, Bob knows that $\psi_{j_B}$ equals "0" or "1." Therefore, when Bob now returns this qubit to Alice, Bob knows that Alice will interpret the outcome of the protocol as a success, but Bob know what believes about the bit's value, because $\psi_{j_B}$ may have been either 0 or 1 with equal probability. In order to prevent Bob from even signaling the occurrence of a |0⟩ or |1⟩ state, Alice can mix in a finite fraction of |−⟩states in her input to the protocol. This reduces the probability that Alice learns the value of the bit a, but it also prevents an unambiguous signaling of her |0⟩ or |1⟩ state by Bob. Alice's optimal strategy here depends entirely on the context in which the protocol is executed. For the bit string commitment protocol described below, Bob is not be able to cheat if he can only signal a |0⟩ or |1⟩ state without knowing the result of Alice's final Pauli Z measurement.

II. Quantum Private Data Sampling Protocol

Figure 4:
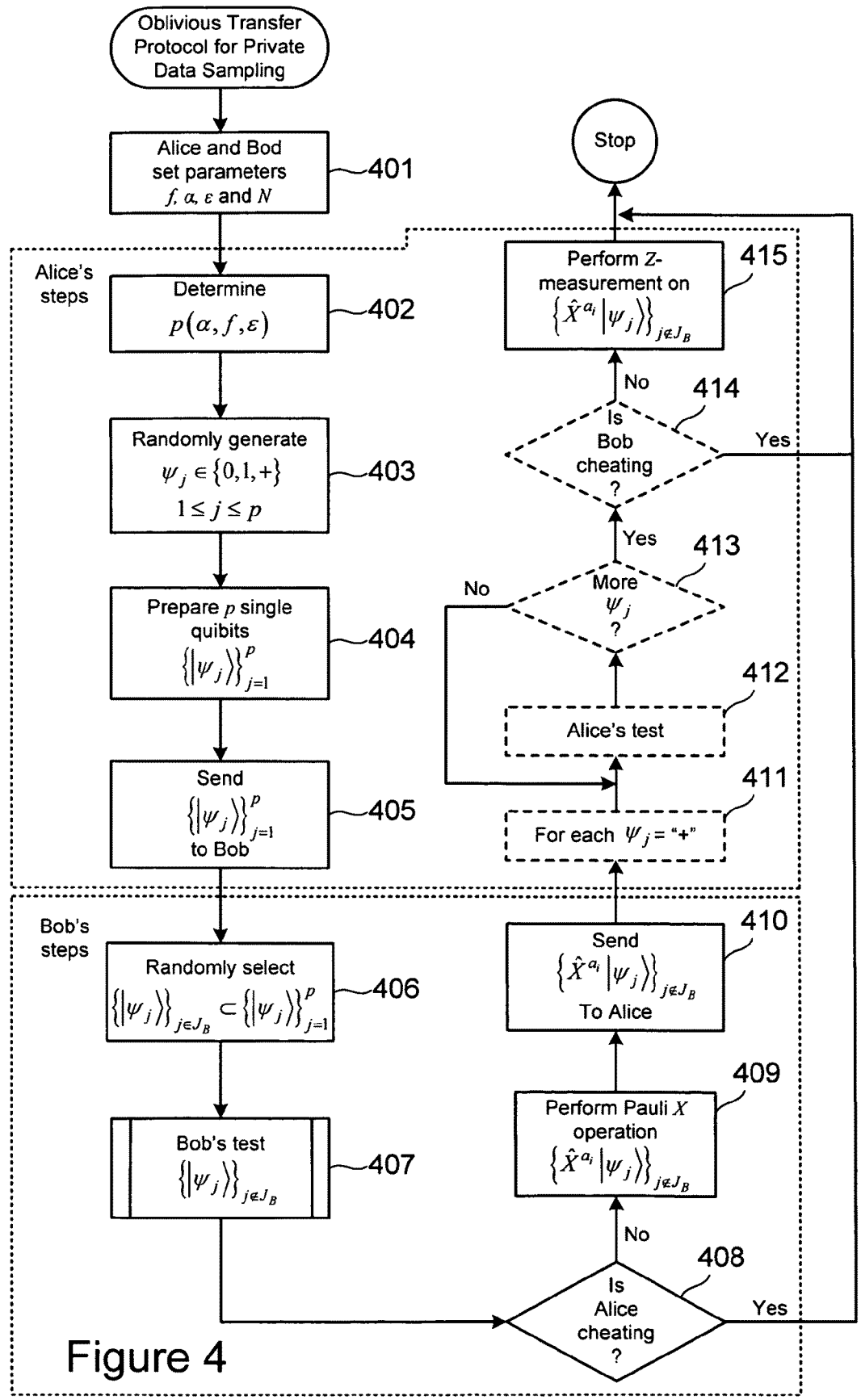
FIG. 4 shows a control-flow diagram of a general N-bit quantum private data sampling protocol carried out in accordance with embodiments of the present invention.

A quantum private data sampling protocol ("QPDS") is a generalization of the QOT protocol described above, where Bob owns an N-bit database with bit values $\{a_1, a_2, \ldots, a_N\}$, where N is a positive integer, and Alice contracts with Bob to learn the value of each bit in the database with probability α. FIG. 4 shows a control-flow diagram of an N-bit QOT protocol carried out in accordance with embodiments of the present invention. In describing a number of the steps of the control-flow diagram, reference is made to example registers shown in FIG. 5. A number of steps in the N-bit QPDS protocol are identical to the steps in the single-bit QOT protocol described above with reference to FIGS. 1-3. As shown in FIG. 4, step 401 is performed by Alice and Bob, steps 402-405 are performed by Alice alone, steps 406-410 are performed by Bob alone, and steps 411-415 are performed by Alice alone.

In step 401, Alice contracts with Bob to learn the value of each bit in an N-bit database $\{a_1, a_2, \ldots, a_N\}$ in Bob's possession with probability α, without Bob learning whether or not Alice succeeded. Alice and Bob agree on the value of the parameters α, ϵ, and f. Bob assumes that Alice's hardware satisfies a list of requirements, such as minimum detector efficiency, and Alice understands that Bob will take steps to ensure that her success probability does not exceed α+ϵ. Bob and Alice perform the protocol in the basis {|0⟩,|1⟩}, where the states |0⟩ and |1⟩ are eigenvalues of the Pauli $\hat{Z}$ operator with eigenvalues +1 and −1, respectively. Each of the N-bits is encoded in the one of the qubit states |0⟩, |1⟩, and |+⟩, as described below. When Bob encodes the value of each bit in the database $\{a_1, a_2, \ldots, a_N\}$ into the states of N qubits sent by Alice, Bob has no knowledge of the state of the N qubits prior to encoding the bits, as described in step 409. Bob uses the remainder of the qubits to test whether or not Alice is participating honestly, as described in step 407. The state |+⟩ is used by both Alice and Bob to test whether or not the other is participating honestly. Like the QOT protocol described above, the states |0⟩ and |1⟩ can be horizontally and vertically polarized photons, respectively, and the state |+⟩ can be a photon polarized at 45°, where $|+\rangle=(|0\rangle+|1\rangle)/\sqrt{2}$.

In step 402, given the parameters α, ϵ, f, and N, Alice selects the parameter p in accordance with:

$$p \approx \frac{2N}{(2-\alpha)\varepsilon^2} \ln\frac{2}{f}$$

In step 403, Alice randomly generates a list $\psi_j$ of p symbols, each of which is selected from the set {0,1,+} with the constraint that the occurrence frequency of the symbols be {α/2, α/2, 1−α}, respectively, where j is an integer index satisfying the condition $1 \leq j \leq p$. FIG. 5A shows an example register 502 of p equal to 30 symbols selected at random from the set {0,1,+} and satisfying the occurrence frequency constraint {α/2,α/2,1−α} for α equal to 0.4. As shown in FIG. 5A, there are 18 entries for the symbol "+"(i.e., (1−α)30 or 0.6×30), and there are 6 entries for each of the symbols "0" and "1" (i.e., (α/2)30 or 0.2×30).

Returning to FIG. 4, in step 404, Alice prepares p single qubits states $|\psi_j\rangle$, where as described above the qubits states |0⟩ and |1⟩ represent the symbols "0" and "1," respectively, and the state |+⟩ represents the symbols "+." FIG. 5B shows an example register 504 of qubits generated by Alice that correspond to the register 502 of symbols displayed in FIG. 5A in accordance with embodiments of the present invention. For example, Alice's can realize the symbol "0" in the first entry j equal to 1 of the register 502 by preparing a photon in a 45° polarization state |+⟩.

Returning to FIG. 4, in step 405, Alice sends the entire set of p qubit states $\{|\psi_j\rangle\}_{j=1}^{P}$ to Bob via a quantum channel. Alice can send the states Bob in the form of polarized photons via free space or over a waveguide. In certain embodiments the states can be sent sequentially so that Bob receives each qubit state one-at-a-time as they are prepared by Alice in order of increasing p.

In step 406, Bob randomly selects a subset of N qubits $\{|\psi_{j_i}\rangle\}_{j_i \in J_B}$ from the set of qubits $\{|\psi_j\rangle\}_{j=1}^{P}$, where $J_B$ is an N-tuple comprising the indices of the selected qubits, and each indices in $J_B$ are distinguished by an index i where $1 \leq i \leq N$ and $j_{i-1} < j_i < j_{i+1}$. At least a portion of the set of selected qubit states $\{|\psi_{j_i}\rangle\}_{j_i \in J_B}$ are used to encode the N-bits $\{a_1, a_2, \ldots, a_N\}$ in subsequent step 409 described below. FIG. 5C shows an example register 506 of 12 randomly selected qubit states from the register 504. The indices $j_i$ of the 12 states form the 12-tuple $J_B$ comprising {1,3,8,9,10,13,19,20, 23,24,28,30}.

In step 407, Bob performs a test described below in a control-flow diagram "Bob's test" using the remaining qubit states $\{|\psi_j\rangle\}_{j \notin J_B}$ to determine whether or not Alice is no participating honestly (i.e, cheating). Alice can dishonestly participate by sending p states that are not in compliance with the occurrence frequency constraint {α/2,α/2,1−α}. FIG. 5D shows an example register 508 of remaining qubit states $\{|\psi\rangle\}_{j \notin J_B}$ where entries corresponding to the set of randomly selected qubit states $\{\psi_{j_i}\rangle\}_{j_i \in J_B}$ are represented by the letter "b."

In step 408, based on the results obtained in Bob's test conducted in step 407, when Bob determines that Alice is cheating, Bob can terminate the QPDS protocol. Otherwise, when Bob determines in step 407 that Alice is participating honestly, Bob proceeds to step 409.

In step 409, Bob encodes the N-bits $\{a_1, a_2, \ldots, a_N\}$ onto the qubit in the set $\{|\psi_{j_i}\rangle\}_{j_i \in J_B}$ obtained in step 406 by performing a set of Pauli X operators $\{\hat{X}^{a_1}, \hat{X}^{a_2}, \ldots, \hat{X}^{a_N}\}$ sequentially to the qubits in the set $\{|\psi_{j_i}\rangle\}_{j_i \in J_B}$, as described above in step 109 of FIG. 1. In other words, taking the direct product of the operators $\{\hat{X}^{a_1}, \hat{X}^{a_2}, \ldots, \hat{X}^{a_N}\}$ with the qubits in the set $\{|\psi_{j_i}\rangle\}_{j_i \in J_B}$ gives $$\{\hat{X}^{a_i}|\psi_{j_i}\rangle\}_{j_i \in J_B}$$

where $1 \leq i \leq N$ and $j_{i-1} < j_i < j_{i+1}$.

FIG. 5E shows writing 12 bits to Bob's selection of qubits displayed in register 506 of FIG. 5C in accordance with embodiments of the present invention. As shown in the example of FIG. 7E, register 510 displays 12 bits. Each of the Pauli X operators 512 $\hat{X}^{a_i}$, where $1 \leq i \leq N$, corresponds to the 12 bits in the register 510. Applying the Pauli X operators 512 $\hat{X}^{a_i}$ to each of the qubit states in the register 506 yields the states in the register 514. Note that the qubit states $|+\rangle$ are unchanged by the Pauli X operator, and the qubit basis states $|1\rangle$ and $|0\rangle$ operated on by the operator $\hat{X}^0$ are also unchanged, such as the qubit state $|0\rangle$ associated with j equal to 3. However, the qubit states $|1\rangle$ and $|0\rangle$ associated with j equal to 8 and 13 are flipped by the operator $\hat{X}^1$.

In step 410, Bob returns the state $\{\hat{X}^{a_i}|\psi_{j_i}\rangle\}_{j_i \in J_B}$ to Alice via a quantum communication channel, returns the N-tupe $J_B$, and Bob optionally returns the results obtained in Bob's test described below with reference to FIG. 4 via a classical channel. Steps 411-414 are optional and relate to Alice's test for determine whether Bob has tampered with states $\{\hat{X}^{a_i}|\psi_{j_i}\rangle\}_{j_i \in J_B}$ in executing his obligations under the N-bit QPDS protocol. Optional steps 411-413 are represented as a for-loop where Alice examines each of the qubit states $|+\rangle$ in $\{\hat{X}^{a_i}|\psi_{j_i}\rangle\}_{j_i \in J_B}$ returned by Bob. In step 411, for each $\psi_{j_B}$ equal to "+," Alice repeats steps 412 and 413. In step 412, because Alice generated the qubit states associated with each entry in the N-tuple $J_B$, Alice knows which of the qubit states returned by Bob should be in the qubit state $|+\rangle$ and which should be in the qubit basis states $|0\rangle$ and $|1\rangle$. Alice tests each state for which $\psi_j$ should equal "+" by performing a Pauli X measurement. When Alice does not obtain the eigenvalue +1 for each $\psi_{j_B}$ equal to "+," Alice knows that Bob has cheated, Bob fails the test and Alice terminates the QPDS protocol.

In step 413, Alice repeats step 412 for each $\psi_j$ equal to "+." For example, Alice performs the Pauli X measurement $\hat{M}_X$ on each of the states in register 514 associated with j equal to 1, 9, 10, 20, 23, 24, and 28. In step 414, when Alice does not obtain the result "+1" for one or more of the Pauli X measurements, Bob fails the test and Alice terminates the QPDS protocol.

In step 415, Alice performs a Pauli Z measurement on each qubit returned to her by Bob in order to learn at least a portion of the values of corresponding bits in the database $\{a_1, a_2, \ldots, a_N\}$. When $\psi_{j_B}$ equals "+," Alice learns nothing, because, as described above in step 409, the Pauli X operation does not change the qubit state $|+\rangle$. But, when $\psi_j$ equals "0" or "1," which should occur with probability $\alpha$, the states returned by Bob are $|\psi_{j_i} \oplus a_i\rangle$, and Alice can retrieve the value of each bit written in the qubit basis states $|0\rangle$ and $|1\rangle$ by performing the Pauli Z measurement on each of these states. Again, Alice knows the state of the qubit she originally prepared in association with each element in the N-tuples $J_B$. Alice performs the Pauli Z measurement to determine the state of each qubit in $\{\hat{X}^{a_i}|\psi_{j_i}\rangle\}_{j_i \in J_B}$ returned by Bob and compares it with each state she originally prepared in step 404. When the Pauli Z measurement reveals that the state returned by Bob $\hat{X}^{a_i}|\psi_{j_i}\rangle$ is different from the state of the originally prepared qubit $|\psi_{j_i}\rangle$ the corresponding bit value is "1," and when the Pauli Z measurement reveals that the state returned by Bob $\hat{X}^{a_i}|\psi_{j_i}\rangle$ is the same as the state of the originally prepared qubit $|\psi_{j_i}\rangle$ the corresponding bit value is "0." Thus, Alice obtained a fixed size random sample of the available data held by the Bob without Bob learning which bits of data were accessed.

FIG. 5F shows results obtained by Alice after performing the Pauli Z measurements on each of the states returned by Bob that are represented in register 514. The entries identified as "n/a" correspond to the qubit states $|+\rangle$. The entries 8 and 13 have bit values "1" which correspond to the flipped states obtained in step 409, and the entries 3, 19, and 30 have bit values "0" which correspond to the states that were not flipped in step 409. Comparing register 516 to the 12-bit database represented by register 510 reveals that Alice has sampled the database and learned the values of the bits $a_2$, $a_3$, $a_6$, $a_7$, and $a_{12}$.

Figure 6:
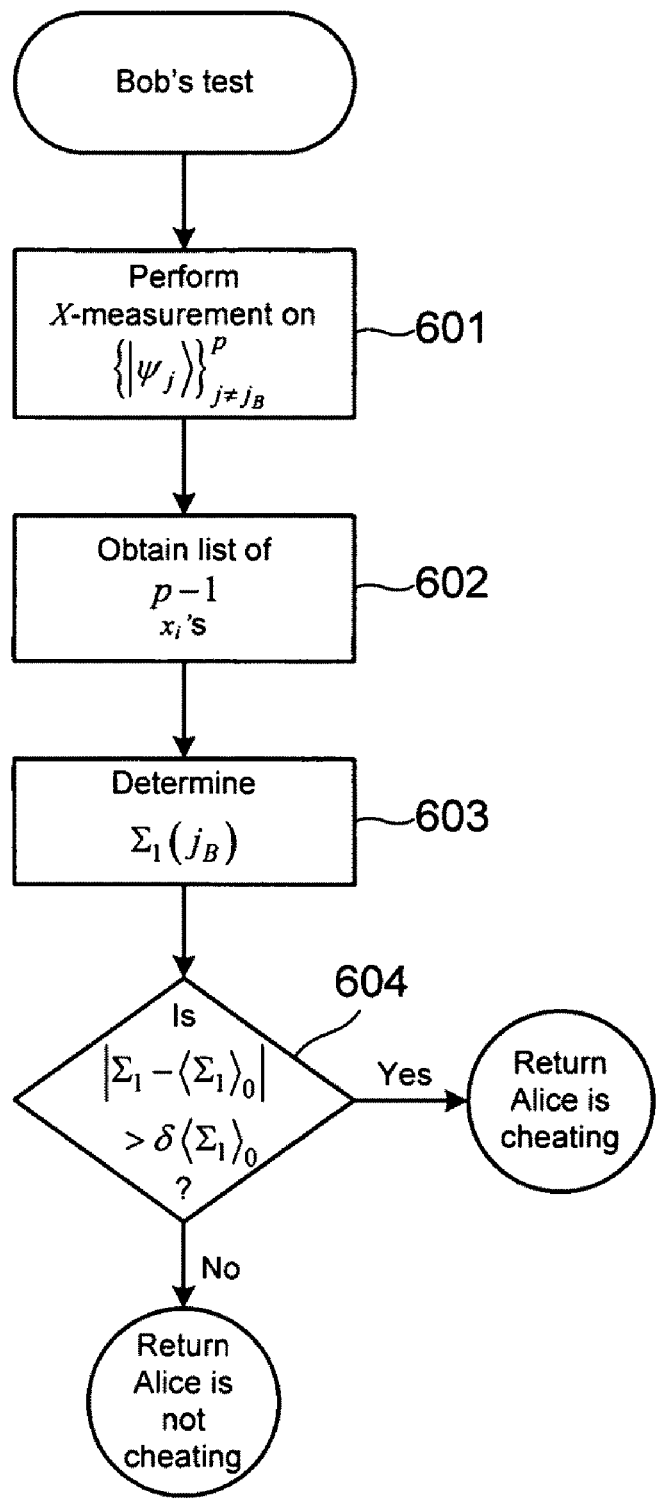
FIG. 6 shows a control-flow diagram of the routine referred to in step 407 of the control-flow diagram shown in FIG. 4, in accordance with embodiments of the present invention.

FIG. 6 shows a control-flow diagram of the routine "Bob's test" referred to in step 407 of the control-flow diagram shown in FIG. 4, in accordance with embodiments of the present invention. In step 601, Bob performs a Pauli X measurement on each of the qubit states $\{|\psi_j\rangle\}_{j \notin J_B}$. In step 602, Bob obtains a list of p–N measurement eigenvalues $x_j = \pm 1$. FIG. 5G shows an example register 518 of p–N $x_j$ eigenvalues obtained from performing the Pauli X measurement on the corresponding qubits displayed in the register 508 in FIG. 5D in accordance with embodiments of the present invention. In FIG. 5G, the entries for $x_1, x_3, x_8, x_9, x_{10}, x_{13}, x_{19}, x_{20}, x_{23}, x_{24}, x_{28}$, and $x_{30}$ are "b," which correspond to qubit states $\{|\psi_j\rangle\}_{j \notin J_B}$ randomly selected by Bob in step 406. Thus, no Pauli X measurement can be performed on these states.

Returning to FIG. 6, in step 603, Bob averages over the p–N $x_j$ values in accordance with:

$$\Sigma_1(N) = \frac{1}{p-1} \sum_{j \notin J_B} x_j$$

Again by the Law of Large Numbers, when Alice is participating honestly, the average value $\langle \Sigma_1(N) \rangle$ of the $x_j$'s should be approximately equal to $\langle \Sigma_1 \rangle_0 = 1 - \alpha$ with high probability. In step 604, Alice fails this test when Bob finds that $$|\Sigma_1(N) - \langle \Sigma_1 \rangle_0| > \delta \langle \Sigma_1 \rangle_0$$

where $$\delta \approx \frac{2\sqrt{\alpha(2-\alpha)}}{1-\alpha} \frac{\varepsilon}{\sqrt{N}}$$

Bob chooses $\delta$ to constrain Alice's excess information.

The QPDS protocol can, in principle, be executed using quantum memory, but it is not necessary. For example, Bob can secretly determine in advance which qubits he returns to Alice, follow the protocol, and then determine a posteriori whether Alice cheated or not. Alternatively, Bob can randomly select qubits to test and to encode as he receives them from Alice, and monitor the results of his tests as the protocol progresses. The security proofs of this protocol are summarized as follows.

In the multi-qubit QPDS protocol, the concept of average accessible information is relied upon to measure Alice's final knowledge of Bob's N-bit database. When Alice is following the protocol faithfully, for large p Alice can learn the values of $\alpha N$ bits in the database. But when Alice pursues the more general strategy of general p-qubit pure state $|\psi\rangle$, at best Bob can limit her knowledge to $h(\alpha/2)N+\epsilon N$, where $h(p)=-p\log_2 p-(1-p)\log_2(1-p)$ is the binary entropy function, and $\epsilon$ is given by $$\varepsilon \approx \frac{1}{2}\sqrt{\frac{N}{1-\langle\Sigma_1\rangle^2}}\left(\delta\langle\Sigma_1\rangle + \frac{N}{p}\right)$$

As in QOT protocol, Bob does not want to stop the protocol without cause, so he should ensure that $f<2\exp[-p\delta^2\langle\Sigma_1\rangle_0^2/8(1-\langle\Sigma_1\rangle_0]$. Therefore, in the limit where $\epsilon\sqrt{N}\gg\log(2/f)$ the choices $$p \approx \frac{2N}{(2-\alpha)\varepsilon^2}\ln\frac{2}{f},$$

and $$\delta \approx \frac{2\sqrt{\alpha(2-\alpha)}}{1-\alpha}\frac{\varepsilon}{\sqrt{N}}$$

are sufficient to constrain Alice's excess information. For example, when N equals 20, $\alpha$ equals 0.5, f equals 0.01, and $\epsilon$ equals 0.1 (so that Alice learns no more than one extra bit), $\delta\approx 0.07$ and $p\approx 15000$. For fixed values of $\alpha$, $\epsilon$, and f, note that the communication complexity for one query of the database by Alice scales as $N^{3/2}$ as $N\to\infty$.

In the QPDS protocol, Bob cannot obtain any information with any certainty about Alice's sample at the end of the protocol, which has practical implications beyond those of QOT described above. Suppose that Bob wishes to convince Alice that his database includes at least n<N entries with a particular characteristic c, without sending (or selling) her the entire database. Bob can simply send Alice a small sample of the database, but Alice has no guarantee that this sample is unbiased. Bob may artificially increase the fraction of entries exhibiting c in the sample, convincing Alice to purchase access to his database even though the actual proportion of c in the database is much smaller than n/N. The QPDS protocol provides an elegant solution to this problem. Bob allows Alice to acquire a small sample of his database (e.g., a small fraction $\alpha$ of the N entries). When Alice finds that the proportion of c in the sample exceeds n/N and then decides to become a subscriber, Alice can a posteriori verify that the database entries corresponding to the sample Alice obtained do indeed match her sample. When Bob tried to alter an entry prior to sending Alice the corresponding bit, Alice inevitably discover this with probability $\alpha$. This is because Bob either does not know which entries Alice obtained (if Bob has been honest), or does not know what value she attributes to any particular entry (if Bob has tried to cheat using an X measurement). When Bob tries to change m<N entries, Bob will remain undiscovered with probability $(1-\alpha)^m$, which rapidly drops to zero as m increases.

The QPDS protocol described above assumes perfect hardware implementations by both Alice and Bob. In practice, there will be transmission and detection errors that need to be carefully taken into account. For instance, if Alice has a lossy detector, Alice will obtain a smaller database sample than with a perfect detector. When Alice has an imperfect state preparation apparatus, Alice will be more likely to fail Bob's test even if Alice intends to be honest. Similarly, when Bob has a faulty detection system, Bob will be more likely to see Bob's test fail even when Alice is honest. When Bob performs faulty X operations, Bob sends Alice some erroneous information, and introduces an uncertainty in Alice's readout. In view of these imperfections, both Alice and Bob ought to have somewhat more tolerance in testing each other's compliance with the QPDS protocol.

System Embodiments for Performing Oblivious Transfer

Figure 7:
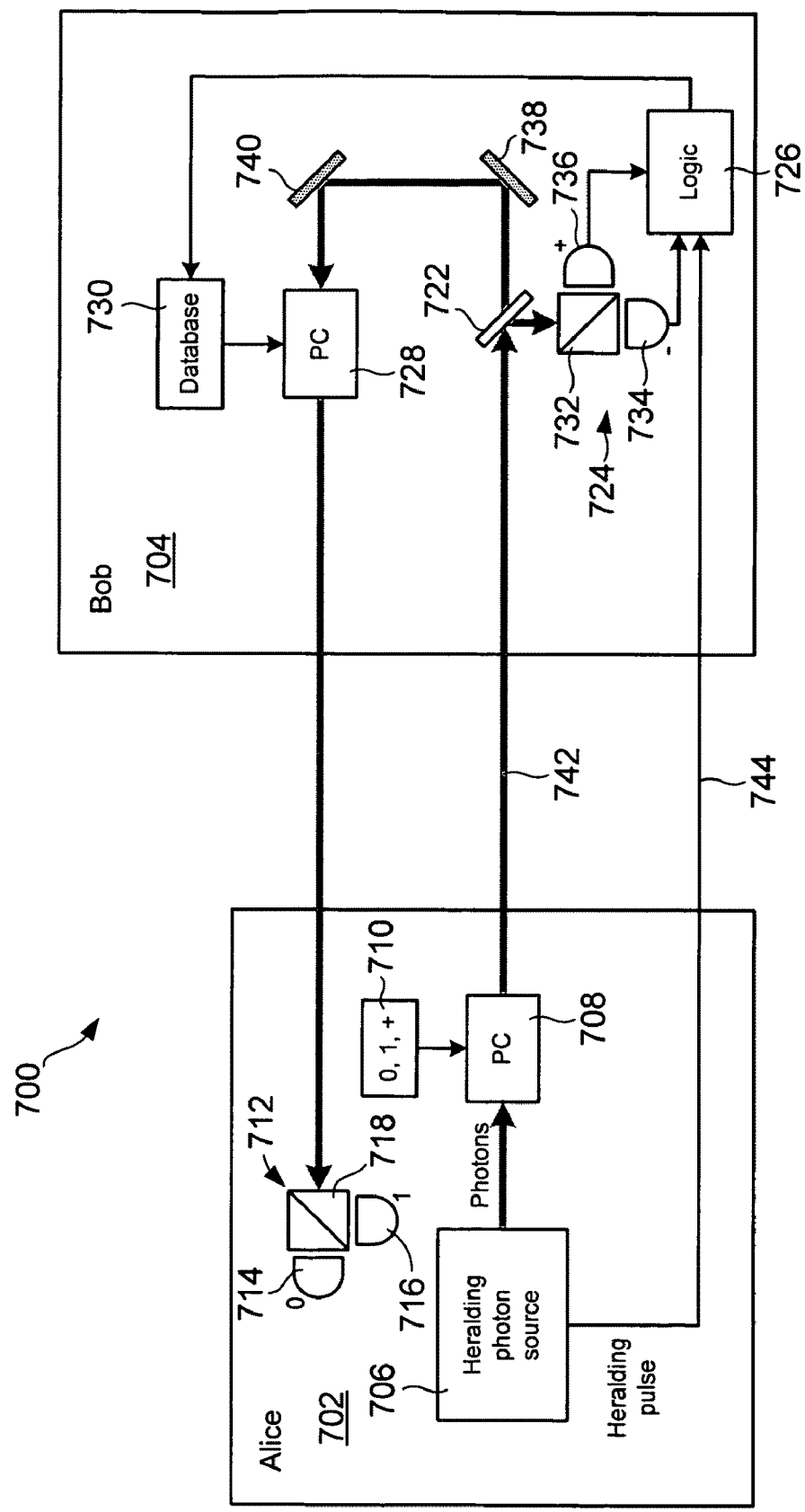
FIG. 7 shows a schematic representation of a first system for implementing oblivious transfer protocols configured in accordance with embodiments of the present invention.

FIG. 7 shows a schematic representation of a system 700 for implementing OT protocols configured in accordance with embodiments of the present invention. The system 700 comprises a database user 702 called "Alice" and a database holder 704 called "Bob." The names Alice and Bob also correspond to the systems configured to perform the operations carried out by Alice and Bob as described above with reference to the QOT and QPDS protocols. Alice 702 includes a heralding photon source 706, a first polarization controller ("PC") 708, memory 710, a first detection system 712 that includes two photodetectors 714 and 716 and a polarizing beamsplitter 718. Light output from the photon source 706 can be transmitted in free space to the PC 708. On the other hand, Bob 704 includes a beamsplitter 722, a second detection system 724, system logic 726, a second PC 728, and a database 730. The second detection system 724 includes a polarizing beamsplitter 732 and two detectors 734 and 736 that are electronically coupled to the system logic 726. Bob also includes two mirrors 738 and 740.

In describing the operation of the components of Alice 702 and Bob 705, reference is made to certain steps in the control-flow diagram shown in FIG. 1 and FIG. 4. Alice uses the memory 710 to randomly generate the symbols "0," "1," and "+" described in steps 103 and 403. Grey directional arrows, such as directional arrow 742, identify the paths of polarized single photon qubits output from the photon source 706. The photon source 706 realizes the polarized single photon qubits with degenerate type II spontaneous parametric down-conversion in a periodically-poled potassium-titanyl-phosphate crystal. Photons with a wavelength of 810 nm are down-converted from a 405 nm pump and separated using a polarization beamsplitter. One beam of the separated photons is detected using a single-photon counting module whose output is used by Alice and Bob to verify the timing information of the incoming photons via a high-speed coincidence circuit, thus removing the effect of dark counts and stray photons. Alice can adjust the polarization of photons using the polarization controller 708. The polarization controller includes electronically controlled Pockel cells that allow Alice to generate photons in the three polarization states $|H\rangle$, $|V\rangle$, and $|R\rangle=(|H\rangle+i|V\rangle)/\sqrt{2}$ representing the states $|0\rangle$, $|1\rangle$, and $|+\rangle$, respectively.

The photons pass through the PC 708 toward the beamsplitter 722. The PC 708 is operated prepare p single qubits as described in steps 104 and 404. The beamsplitter 722 is configured to reflect a first portion to the polarizing beamsplitter 732 of the second detection system 724 and transmits a second portion directed by the mirrors 738 and 740 to the PC 728. In other words, the beamsplitter 722 samples a fraction of the photons and then projects the sampled photons into the $\{|+\rangle,|-\rangle\}$ basis at the second detection system 724. The first portion corresponds to the randomly selected states in steps 106 and 406. The second portion are used to perform Bob's test referred to in steps 107 and 407.

The detection system 724 and system logic 726 are used to perform Bob's test described in steps 107 and 407. As shown in FIG. 7, the photon source 706 is electronically coupled to the system logic 726 via a signal line 744. When a polarized photon is output from the photon source 706, an electronic heralding pulse is also output from the photon source 706 and sent over the signal line 744 to the system logic 726. The system logic 726 and the photodetectors 734 and 736 are configured so that when a photon is detected by one of the photodetectors 734 and 736, a corresponding heralding pulse also arrives at the system logic 726 at substantially the same time. The system logic 726 stores and processes each heralding pulse and stores the detection event associated with the corresponding photon state detected by the photodetectors 734 and 736. Because a certain number of photons are also transmitted through the beamsplitter 722 and do not reach the detectors 734 and 736, a number of heralding pulses can arrive at the system logic 726 without a corresponding detection event occurring at the photodetectors 734 and 736. For each heralding pulse received, the system logic 726 records which detector detected a photon reflected by the beamsplitter 722 and records non-detection events associated with photons that are transmitted through the beamsplitter 722. The heralding pulse can also be used by the system logic 726 to discard dark states which occur when one of the photodetectors 734 and 736 outputs a false detection event indicating that a photon has been detected when in fact one has not. When a photon detection event is observed but no corresponding heralding pulse arrives at the system logic 726, the system logic 726 does not record the detection event.

When Bob is satisfied that Alice is not cheating, as described above in steps 108 and 408, Bob performs an appropriate transformation on a first portion of qubits using the second PC 728, as described in steps 109 and 409, and sends to Alice the qubit time-stamp information to as described in steps 110 and 410. Alice then performs measurements on the qubit in the basis $\{|0\rangle,|1\rangle\}$ using the first detection system 712, as described in steps 114 and 415.

Figure 8:
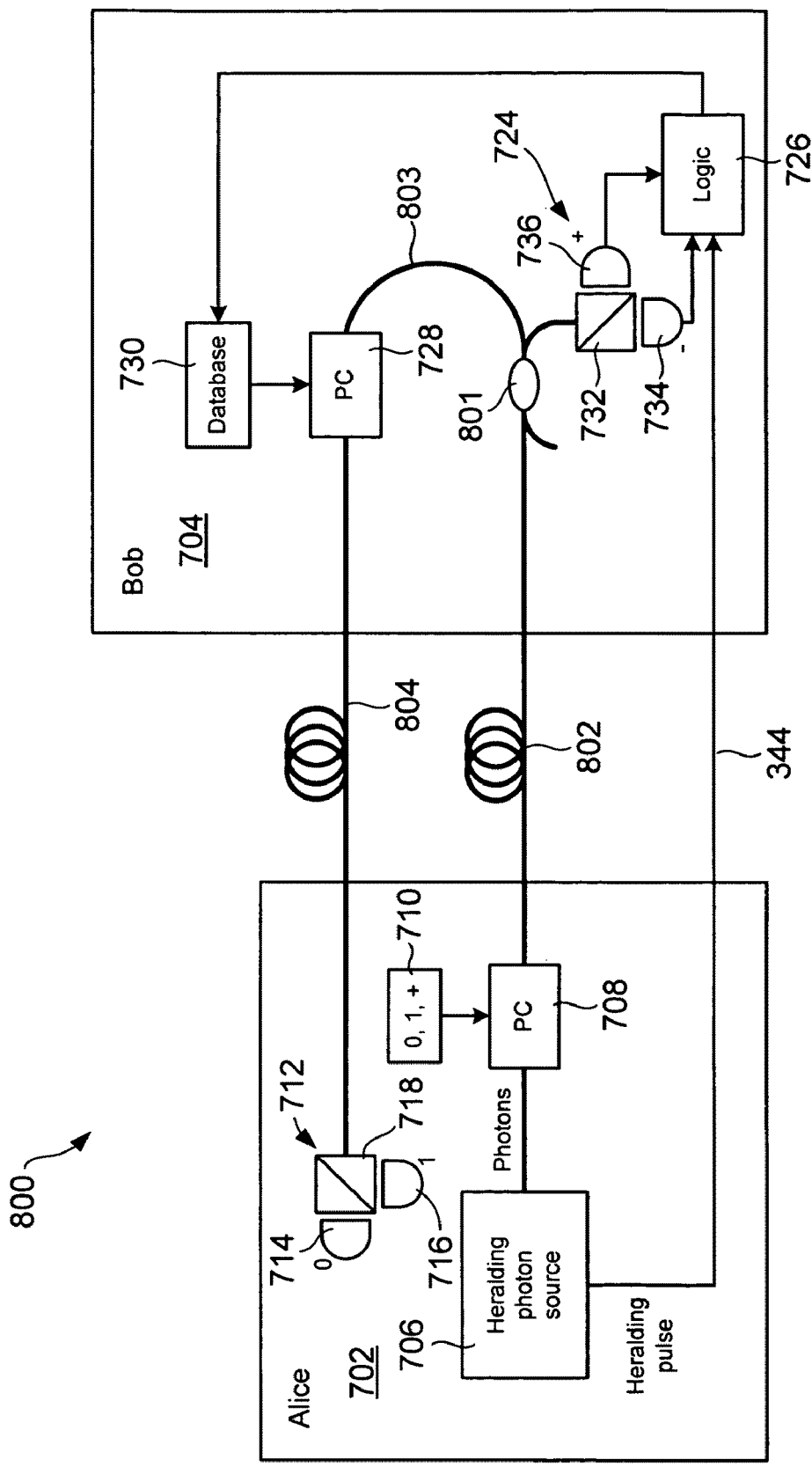
FIG. 8 shows a schematic representation of a second system 800 for implementing oblivious transfer protocols configured in accordance with embodiments of the present invention.

FIG. 8 shows a schematic representation of a system 800 for implementing OT protocols configured in accordance with embodiments of the present invention. The system 800 is nearly identical to the system 700 except rather than relying on free space to carry photons from Alice to Bob and back to Alice, a number of the free space optical paths of the system 700 are replaced with optical fibers, the beamsplitter 722 is replaced by a fiber coupler 801, and the mirrors 738 and 740 are eliminated. Optical fibers 802-804 replace the free space paths connecting the PC 708 to the coupler 801, connecting the coupler to PC 728, and connecting the PC 728 to the detection system 712.

Experimental Demonstration

Figure 9:
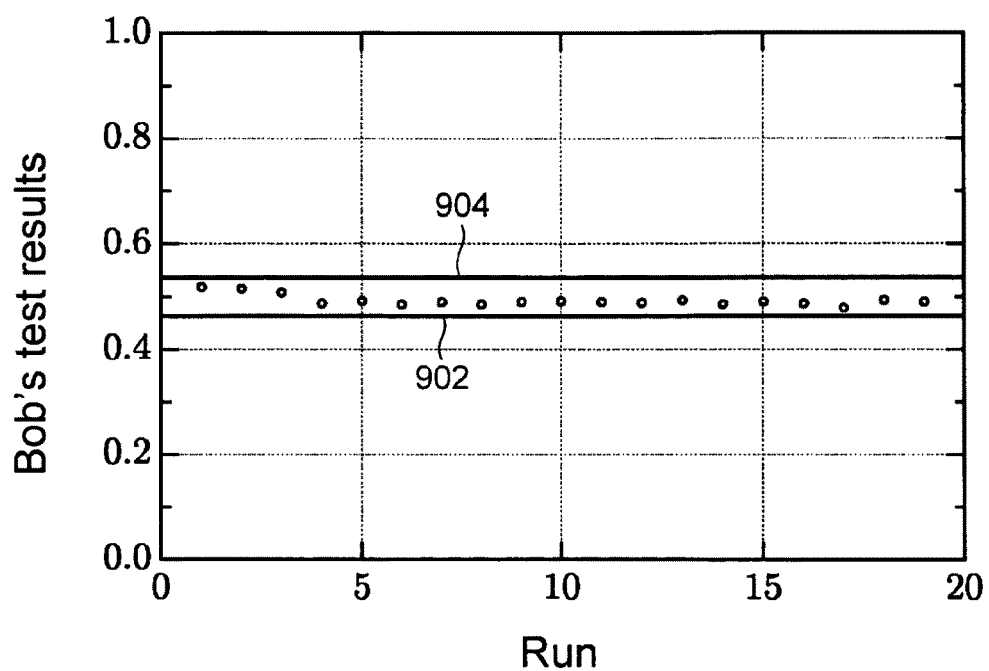
FIG. 9 shows results obtained from performing a quantum private data sampling protocol on a table-top implementation of the system shown in FIG. 7 in accordance with embodiments of the present invention.
Figure 10:
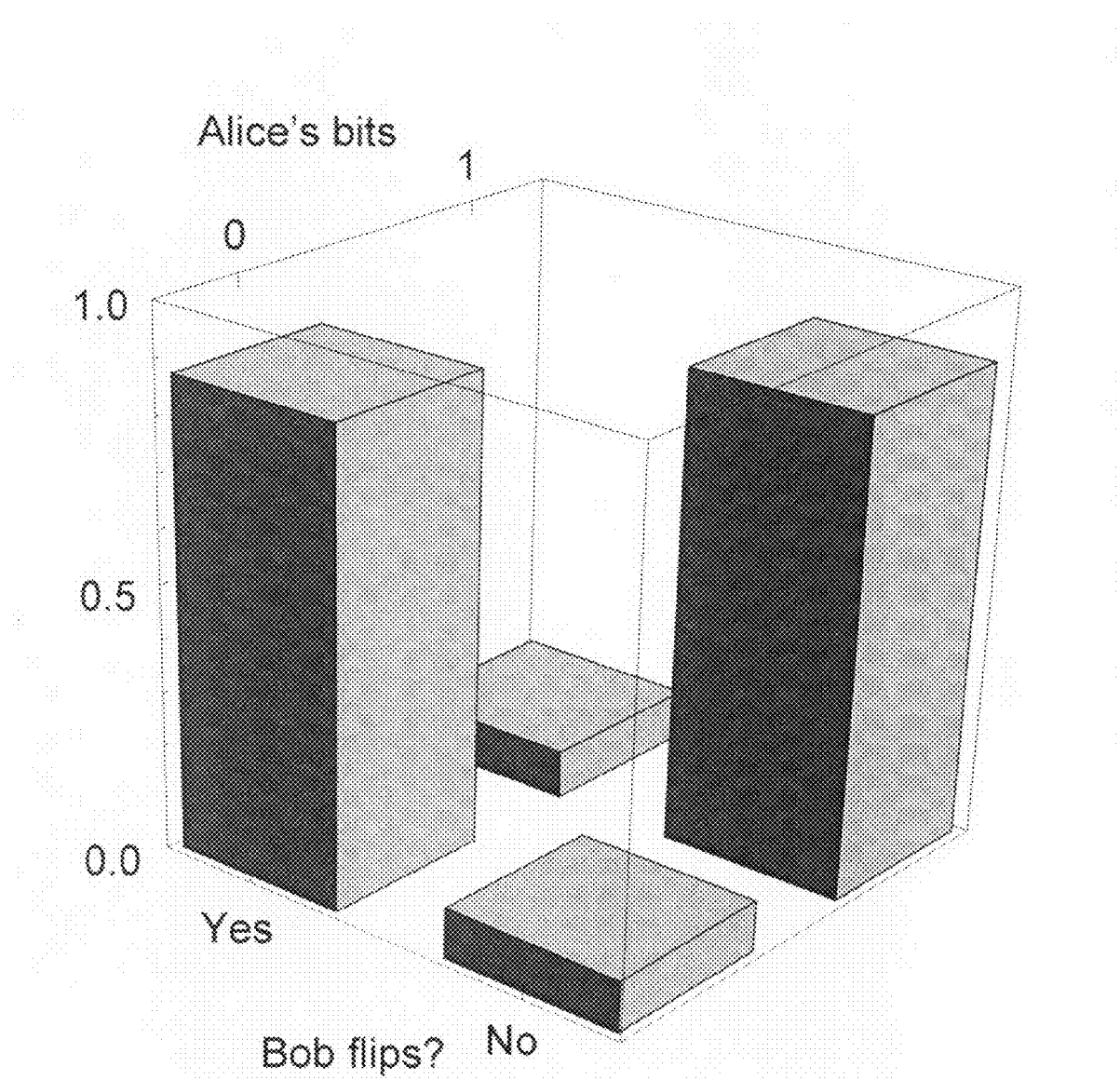
FIG. 10 shows a plot of results of measurements performed on photons generated with a table top implementation of the system shown in FIG. 7 in accordance with embodiments of the present invention.

Experimental demonstrations of the QPDS protocol were performed using a tabletop implementation of the system 700 for a database size of 20, using 60,000 single photons per run of the protocol. FIG. 9 shows Bob's test results performed 19 independent runs of the QPDS protocol using a table-top implementation of the system 700. Open circles represent the results obtained in determining $\Sigma_1$. Lines 902 and 904 correspond to $|\Sigma_1-\langle\Sigma_1\rangle_0|$. As shown in FIG. 9, Alice performed honestly, and passed Bob's test for every run. In theory, Alice always measures 1 when she sends $|1\rangle$ and Bob does not flip the qubit, and 0 when she sends $|0\rangle$ and Bob flips the qubit. In the cases when Alice sends $|0\rangle$ and Bob does not flip the qubit or Alice sends $|1\rangle$ and Bob does flip the qubit Alice should never measure 1. FIG. 10 shows a plot of the results of Alice's measurements on the photons returned by Bob using the same table top implementation of the system 700. FIG. 10 reveals the probability that Alice measures 1 for the various possible configurations and is in very good agreement with theory. The implementation of system 700 provided results that are close to the ideal with error rates of approximately 10% due to imperfections in state preparation and detection.

The QOT and QPDS protocols are readily implementable with the same hardware required by BB84 quantum key distribution. The QOT and QPSD protocols do not base security on entanglement, have a small communication complexity (scaling as the 3/2 power of the database size), and do not require quantum memory. Note that for QPDS protocol, in general, Alice's accessible information can be held arbitrarily close to an upper limit of $h(\alpha/2)\geq\alpha$, but it is not entirely clear that there is in fact any general strategy available to Alice that reliably allows her to learn more than a fraction $\alpha$ of Bob's database.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for allowing a database user to sample data stored in a database comprising:
   preparing multiple qubits by the database user using a photon source and a polarization controller;
   sending each of the multiple qubits from the database user to a database owner; receiving at least one of the multiple qubits returned to the database user from the database owner, wherein the database owner encodes each bit of the sample data into the state of each of the at least one multiple qubits returned to the database user;
   measuring the state of each of at least one returned qubits using a detection system to determine none or at least one of the bits of the sample data; and
   testing the at least one returned qubits using the detection system to determine whether or not the database owner tampered with the at least one returned qubit before the at least one returned qubit is sent from the database owner to the database user.

2. The method of claim 1 wherein preparing the multiple qubits further comprising
   randomly generating a list of symbols using memory, wherein each symbol is selected from a set of three symbols; and
   preparing each qubit in one of three different qubit states using the polarization controller, wherein each qubit state is associated with one of the three different symbols.

3. The method of claim 2 wherein each symbol is selected from a set $\{0,1,+\}$ with the constraint that the occurrence frequency of the symbols is $\{\alpha/2,\alpha/2,1-\alpha\}$, respectively, where $\alpha$ is the probability of the database user learning the value of each at least one bit possessed by the database owner.

4. The method of claim 1 wherein testing the at least one returned qubit further comprises:
   identifying at least one qubit in the at least one returned qubits originally prepared by the database user to encode no information; and
   determining whether the state of the at least one qubit prepared to encode no information has changed when returned from the database owner, wherein when the state has changed, the database user knows the database owner tampered with the qubits.

5. The method of claim 4 wherein when testing the at least one returned qubit further comprises revealing to the database user that the database owner tampered with the qubits, the database user terminates sampling data from the database owner.

6. The method of claim 1 wherein receiving the at least one of the multiple qubits from the database owner further comprises sending the at least one of the multiple qubits via a quantum communication channel.

7. The method of claim 1 wherein measuring the at least one returned qubits to determine the information sent by the database owner further comprises performing a measurement on each of the at least one qubits to be returned by the database owner using the detection system to determine the state of each returned qubit and compare the state of each returned qubit with the state of each corresponding originally prepared qubit such that when the state of a returned qubit is determined to be different from the state of the corresponding originally prepared qubit the database owner is to assign one bit value to the returned qubit, and when the state of the returned qubit is determined to be the same as the state of the originally prepared qubit the database owner is to assign the other bit value to the returned qubit.

8. A method for providing a sample of data stored in a database to a database user comprising:
   receiving multiple qubits from the database user;
   randomly selecting at least one of the qubits using a detection system;
   encoding each bit of the sample of data stored in the database in the state of one of the at least one selected qubits using a polarization controller;
   returning the at least one selected qubits to the database user to enable the database user to measure the state of each of the returned qubits to determine none or at least one of the bits of the sample data; and
   testing the at least one returned qubits using the detection system to determine whether or not the database owner tampered with the at least one returned qubit before the at least one returned qubit is sent from the database owner to the database user.

9. The method of claim 8 wherein receiving multiple qubits from a database user further comprises each qubit is in one of a three different qubit states.

10. The method of claim 8 further comprising performing a test using the unselected qubits to determine whether or not the database user is participating honestly.

11. The method of claim 10 wherein performing a test using the unselected qubits further comprises:
   performing a Pauli X measurement on each of the unselected qubits to obtain associated eigenvalues using the detection system;
   computing the average value $\Sigma_1$ of eigenvalues using system logic; and
   determining that the database user fails the test when $$\left|\sum_1 - \langle\sum_1\rangle_0\right| > \delta \langle\sum_1\rangle_0$$

where $$\langle\sum_1\rangle_0 = 1 - \alpha$$

with $1-\alpha$ is the probability that Alice does not learn the value of bit and $\delta$ is chosen to constrain the database users excess information.

12. The method of claim 10 wherein performing a test using the unselected qubits to determine whether or not the database user participates honestly in the method further comprises terminating the database user's access to the sample of data when the database user is determined not to participate honestly.

13. The method of claim 8 wherein encoding each bit stored in the database in the state of each of the at least one selected qubits further comprises for each of the selected qubits,
   performing an X operation $\hat{X}^\alpha$ that flips the state of the qubit using the polarization controller when the bit a has a first value; and
   leaving the qubit unchanged when the bit a has a second value.

14. The method of claim 8 wherein returning the at least one selected qubits to the database user further comprises sending the qubits to the database user via a quantum communication channel.

15. A system for sampling data stored in a database controlled by a database owner comprising:
   a qubit source to generate a sequence of qubits by the database user using a photon source and a polarization controller;
   a random symbol generator to generate a random list of symbols;
   a qubit state controller electronically coupled to the random symbol generator to receive the qubits output from the qubit source, and sequentially place each qubit in a qubit state corresponding to one of the symbols, wherein the sequence of qubits are to be sent to the database owner;
   a detection system to receive a portion of the qubits returned from the database owner, wherein none or at least one bit to be stored in the database is to be written to at least a portion of qttbits returned; and
   a testing system for testing the at least one returned qubits using the detection system to determine whether or not the database owner tampered with the at least one returned qubit before the at least one returned qubit is sent from the database owner to the database user.

16. The system of claim 15 wherein the detection system further comprises:
- a splitter to separate qubits into a first qubit basis state and a second qubit basis state;
- a first detector to detect qubits in the first qubit basis state; and
- a second detector to detect qubits in the second qubit basis state.

17. A system for providing a sample of data stored in a database comprising:
- a preparation system to prepare multiple qubits by the database user using a photon source and a polarization controller;
- a splitter to receive and to randomly separate a sequence of qubits to be provided by a database user into a first portion of qubits and a second portion of qubits;
- a testing system to receive the first portion and determine whether or not the database user participates honestly; and
- a qubit state controller electronically coupled to the database, the controller to encode each bit stored in the database into the state of each qubit in the second portion of qubits before the second portion is to be returned to the database user.

18. The system of claim 17 wherein the testing system further comprises:
- a detection system to receive and determine the state of each qubit in the first portion of qubits; and
- system logic electronically coupled to the detection system, the system logic to receive information about the state of each qubit from the detection system and to determine whether or not the database user participates honestly.

19. The system of claim 18 wherein the detection system further comprises:
- a splitter to separate qubits into a first qubit basis state and a second qubit basis state;
- a first detector to detect qubits in the first qubit basis state; and
- a second detector to detect qubits in the second qubit basis state.

* * * * *

UNITED STATES PATENT AND TRADEMARK OFFICE
CERTIFICATE OF CORRECTION

PATENT NO. : 8,171,051 B2
APPLICATION NO. : 12/288113
DATED : May 1, 2012
INVENTOR(S) : David A. Fattal et al.

Page 1 of 1

It is certified that error appears in the above-identified patent and that said Letters Patent is hereby corrected as shown below:

On the face page, in field (75), Inventors, in column 1, line 2, delete "Marco Florentino," and insert -- Marco Fiorentino, --, therefor.

In column 26, line 9, in Claim 11, delete "$\sum_1 of$" and insert -- $\sum_1 of$ --, therefor.

In column 26, line 62, in Claim 15, delete "qttbits" and insert -- qubits --, therefor.

Signed and Sealed this
Eighth Day of January, 2013

David J. Kappos
*Director of the United States Patent and Trademark Office*